(12) United States Patent
Beausoleil et al.

(10) Patent No.: US 8,929,694 B2
(45) Date of Patent: Jan. 6, 2015

(54) COMPOSITE PROCESSORS

(75) Inventors: Raymond G Beausoleil, Redmond, WA (US); Marco Fiorentino, Mountain View, CA (US); Moray McLaren, Bristol (GB); Greg Astfalk, Parker, TX (US); Nathan Lorenzo Binkert, Redwood City, CA (US); David A. Fattal, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 11 days.

(21) Appl. No.: 13/978,039

(22) PCT Filed: Jan. 20, 2011

(86) PCT No.: PCT/US2011/021891
§ 371 (c)(1),
(2), (4) Date: Aug. 5, 2013

(87) PCT Pub. No.: WO2012/099590
PCT Pub. Date: Jul. 26, 2012

(65) Prior Publication Data
US 2013/0318325 A1    Nov. 28, 2013

(51) Int. Cl.
*G02B 6/12* (2006.01)
*G06F 15/80* (2006.01)
*G06F 3/00* (2006.01)

(52) U.S. Cl.
CPC . *G06F 15/80* (2013.01); *G06F 3/00* (2013.01)
USPC ............... 385/14; 385/15; 385/24; 385/31; 385/33; 385/37

(58) Field of Classification Search
CPC .... G02B 6/43; G02B 6/4214; G02B 6/12004; G02B 6/12

USPC .............................. 385/14, 15, 24, 31, 33, 37
See application file for complete search history.

(56) References Cited

U.S. PATENT DOCUMENTS

| 6,411,418 B1 | 6/2002 | Deri et al. |
|---|---|---|
| 7,505,822 B2 | 3/2009 | Vishkin |

(Continued)

OTHER PUBLICATIONS

International Preliminary Report on Patentability, Aug. 1, 2013, The International Bureau of WIPO, PCT Patent Application No. PCT/US2011/021891.

(Continued)

*Primary Examiner* — Jennifer Doan
(74) *Attorney, Agent, or Firm* — Hewlett-Packard Patent Department; Benjamin Searle

(57) ABSTRACT

In one example, a composite processor includes a circuit board, a first processor element package, and a second processor element package. The circuit board has an optical link and an electrical link. The first processor element package includes a substrate with an integrated circuit, a sub-wavelength grating optical coupler, and an electrical coupler coupled to the electrical link of the circuit board. The second processor element package includes a substrate with an integrated circuit, a sub-wavelength grating optical coupler, and an electrical coupler coupled to the electrical link of the circuit board. The sub-wavelength grating optical coupler of the first processor element package, the optical link of the circuit board, and the sub-wavelength grating optical coupler of the second processor element package collectively define an optical communications path between the substrate of the first processor element package and the substrate of the second processor element package.

15 Claims, 16 Drawing Sheets

(56) References Cited

U.S. PATENT DOCUMENTS

| | | | |
|---|---|---|---|
| 7,684,663 | B2 | 3/2010 | Deane |
| 8,231,284 | B2* | 7/2012 | Doany et al. .................... 385/92 |
| 2002/0005973 | A1 | 1/2002 | Pfeiffer |
| 2002/0154354 | A1 | 10/2002 | Raj et al. |
| 2003/0035169 | A1 | 2/2003 | Byers et al. |
| 2014/0044392 | A1* | 2/2014 | Fattal et al. .................... 385/14 |

OTHER PUBLICATIONS

Batten, Christopher. Research Statement for Christopher Batten. Massachusetts: Institute of Technology. 5 pages, 2014.

Bergman, Keren, et al. "On-chip photonic communication for high-performance multi-core processors." HPEC 2007 Workshop. 2007. 2 pages.

Bliss, Nadya T., et al. "Photonic Many-Core Architecture Study." (2008). 2 pages.

International Search Report and Written Opinion, Oct. 4, 2011. PCT Patent Application No. PCT/US2011/021891.

Joshi, Ajay, et al. "Silicon-photonic clos networks for global on-chip communication." Proceedings of the 2009 3rd ACM/IEEE International Symposium on Networks-on-Chip. IEEE Computer Society, 2009. 10 pages.

Jouppi, Norman P., et al. "System implications of integrated photonics," ISPLED. Aug. 11-13, 2008 [retrieved on Jul. 1, 2013]. pp. 183-184. Retrieved from the Internet: <URL: http://islped.org/X2008/Jouppi.pdf>.

Kwon, Yong-jin. "Analyzing the Effectiveness of On-chip Photonic Interconnects with a Hybrid Photo-electrical Topology." Department of EECS, University of California, Berkeley, CA. 10 pages, 2014.

Stojanovic, Vladimir, et al. "Manycore processor networks with monolithic integrated CMOS photonics." Lasers and Electro-Optics, 2009 and 2009 Conference on Quantum electronics and Laser Science Conference. CLEO/QELS 2009. Conference on. IEEE, 2009, 2 pages.

\* cited by examiner

COMPOSITE PROCESSORS

GOVERNMENT LICENSE RIGHTS

This invention was made in the course of research partially supported by grants under contract number H98230-09-C-0333 awarded by the Maryland Procurement Office. The U.S. Government has certain rights in the invention.

CROSS-REFERENCE TO RELATED APPLICATION

This application is a U.S. National Stage Application of and claims priority to International Patent Application No. PCT/US2011/021891, filed on Jan. 20, 2011, and entitled "COMPOSITE PROCESSORS".

BACKGROUND

Processors such as microprocessors are typically highly-integrated devices including multiple processor units that are manufactured on a single substrate or combination of substrates housed in a common package. The level of integration between the various processor units required to develop such a processor increases the costs and difficulty of manufacturing such processors. Moreover, this amount of integration can complicate the development of custom or application-specific processors.

Users of such processors such as systems designers often select generic processors for use in a product rather than develop a processor specific for that product. The selected processor is, therefore, often not optimized for the product and as a result can have undesirable energy (or power) utilization and/or low performance.

DETAILED DESCRIPTION

Figure 1:
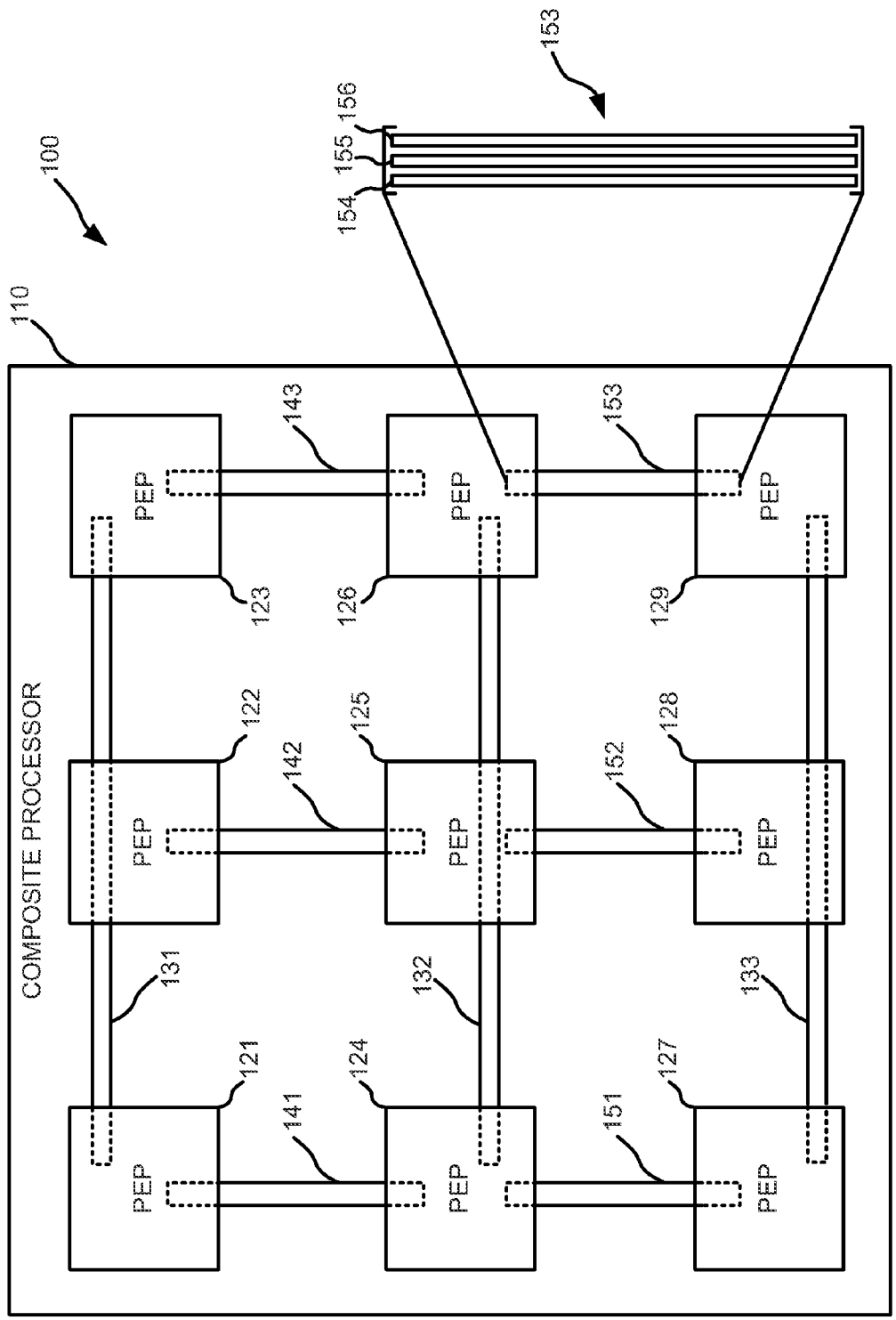
FIG. 1 is a schematic block diagram of a composite processor, according to an example.

A processor is a device or group of devices that operates on data and/or controls peripheral devices in communication with that processor. For example, a microprocessor that includes one or more integrated circuits implementing a central processor (or processing) unit, a floating-point unit, a cache memory, and a graphical processor unit is a processor. Similarly, a group or duster of microprocessors or computing devices, such as computer servers, each including one or more microprocessors is a processor.

Typically, processors are highly-integrated devices that include multiple processor units (or dements or blocks) and/or memory units (both referred to herein generically as "processor units") such as a central processor unit, an arithmetic unit, a floating-point unit, a cache memory, and/or a graphical processor unit implemented on a single substrate die and included within a single package (i.e., a chip carrier or microchip), or are groups of similar such devices. Such integration is useful to increase the operating speed of processors and to lower power requirements, for example, because data paths among the various processor units are short and the processor units and/or memory units can be optimized for interaction one with another.

This integration, however, can increase production costs and defect losses for such processors because relatively large substrate dies are required to implement the various processor units at a single substrate die. Recently, processors implemented as multi-chip modules or multi-chip packages have been developed. Multi-chip modules are packages in which multiple substrate dies, each implementing one or more processor units, are coupled one to another to implement a processor within a single package. Such multi-chip modules, however, typically require significant cooperation among the manufacturers of the various substrate dies included in such multi-chip modules to prevent incompatibilities among and defect losses of the various substrate dies.

Due to high production costs of such processors and the degree of integration and cooperation necessary to produce a multi-chip module processor, development of custom or application-specific processors can be costly. Indeed, some entities with limited funds are altogether prevented from developing application-specific processors due to a lack of financial resources and/or relationships with processor manufacturers. Thus, it can be difficult to develop application-specific processors that are, for example, optimized to consume the least amount of energy to perform one or more tasks.

Moreover, although processors have been implemented with one or more processor units, each within a package separate from another package including other processor units (e.g., graphic processor units are often implemented in separate packages from a package including other processor units of a processor), interconnection speed and latency limitations between these packages can prevent such processors from meeting operating requirements. Similarly, processors implemented as a group of devices often suffer from communications bandwidth or throughput limitations that reduce the efficacy of such processors. Such processors often fail to meet operating requirements even when implemented with optical interconnects (i.e., opto-electronic elements (or repeaters) that convert electrical signals from the devices to optical signals for distribution to the other devices and the optical signals to electrical signals that are provided to the devices) between the devices due to, for example, interconnection speed and latency limitations arising from electrical-to-optical and optical-to-electrical conversion.

Examples described herein are optically-enabled composite (or ensemble) processors that include multiple processor element packages operatively coupled one to another by direct optical interconnects. That is, examples described herein are composite processors implemented as a group of processor element packages communicating one with another using optical signals without intermediary opto-electronic elements. Each processor element package of a composite processor includes one or more processor units and communicates with other processor element packages via optical interfaces of the processor element packages and optical links of that composite processor. In other words, there is an optical communications path between the processor element packages of the composite processor. Said differently, the processor element packages of the composite processor are in optical communication with, communicate optically with, or are optically coupled to one another.

Such composite processors allow, for example, implementation of custom and/or application-specific processors without cooperation from a full-scale processor manufacturer. For example, the composite processor can be implemented by selecting processor element packages including desired processor units and mounting these processor element packages on a circuit board including optical links to connect the processor element packages one to another. Because the desired processor units are implemented in separate processor element packages, the composite processor can be tailored to particular uses and/or optimized, for example, for specific processing tasks by selecting and interconnecting only the processor element packages including the desired or necessary processor units for those tasks.

As used in this specification, the singular forms "a," "an," and "the" include plural referents unless the context clearly dictates otherwise. Thus, for example, the term "processor unit" is intended to mean one or more processor units or a combination of processor units. Additionally, as used herein, the term "optical" and terms deriving or related thereto are used generically and broadly to refer to any applicable spectral range including visible, ultraviolet, and infra-red electromagnetic radiation. Furthermore, as used herein, the term "module" refers to circuitry and/or software, firmware, programming, machine- or processor-readable instructions, commands, or code that are stored at a memory and executed or interpreted at a processor.

FIG. 1 is a schematic block diagram of a composite processor, according to an example. Composite processor 100 includes processor element packages (labeled "PEP" in FIG. 1) 121, 122, 123, 124, 125, 126, 127, 128, and 129 and circuit board 110. A circuit board is a substrate or group of substrates that includes one or more links such as optical links (e.g., waveguides or optical fibers) and/or electrical links (e.g., electrically conductive traces) via which communication symbols can be distributed among and operational energy can be provided to processor element packages operatively coupled to the circuit board. Said differently, the circuits of a circuit board include optical circuits (or links) and electrical circuits (or links). For example, circuit board 110 includes optical links 131, 132, 133, 141, 142, 143, 151, 152, and 153. In some examples, optical links 131, 132, 133, 141, 142, 143, 151, 152, and 153 form or define the principal communications bus or interconnections in composite processor 100. Said differently, the global interconnect network is defined by optical links 131, 132, 133, 141, 142, 143, 151, 152, and 153. In some examples, no communications within composite processor 100 are made over or via electrical links (not shown) to which processor element packages 121, 122, 123, 124, 125, 126, 127, 128, and 129 are coupled. That is, in some examples, electrical links (not shown) to which processor element packages 121, 122, 123, 124, 125, 126, 127, 128, and 129 are coupled are exclusively used to distribute operational energy (or power) to processor element packages 121, 122, 123, 124, 125, 126, 127, 128, and 129.

A processor element package is a package (or chip carrier or microchip) that includes a substrate with an integrated circuit implementing a processor unit of a processor. That is, a processor element package includes a substrate within a case such as a plastic case or ceramic case and couplers (e.g., optical couplers and/or electrical couplers) via which the substrate interfaces with devices (e.g., a circuit board, other processor element packages, and/or a power supply) external to the processor element package.

An optical coupler defines a path for optical energy to be exchanged between the substrate and devices external to the processor element package. That is, optical signals (e.g., optical signals representing data symbols) can be exchanged between the substrate and devices external to the processor element package without intermediate conversion, for example, to electrical signals. For example, an optical coupler can include an optical waveguide such as a dense wavelength division multiplexing optical ("DWDM") waveguide, an optical fiber, an optical grating, and/or a lens such as a planar lens.

An electrical coupler defines a path for electrical energy to be exchanged between the substrate and devices external to the processor element package. For example, an electrical coupler can be an electrically conductive wire or an electrically conductive pin of the processor element package.

Examples of processor units implemented at one or more of processor element packages 121, 122, 123, 124, 125, 126, 127, 128, and 129 include: central processor units; multi-core central processor units; cache memories and random-access memories (e.g., dynamic random access memory memories ("DRAM")); and coprocessor units such as mathematic units (e.g., arithmetic units or floating-point units), algorithmic units, graphic units, communications interface units (i.e., processor units that implement one or more communications protocols), and/or other coprocessor units. A processor element package can be referred to based on a processor unit included within (or implemented by or at) that processor element package. For example, a processor element package at which a central processor unit is implemented (e.g., a substrate of that processor element package includes an integrated circuit that includes or defines logic to implement or realize a central processor unit) can be referred to as a central processor unit package. Similarly, a processor element package implementing a coprocessor (e.g., an arithmetic unit, a floating-point unit, an algorithmic unit, a graphic processor unit, or a communications interface unit) can be referred to as a coprocessor package. Or, more specifically, a processor element package implementing a floating-point unit can be referred to as a floating-point package and a processor element package implementing a cache memory can be referred to as a cache memory package.

Each of processor element packages 121, 122, 123, 124, 125, 126, 127, 128, and 129 are operatively coupled to one or more of processor element packages 121, 122, 123, 124, 125, 126, 127, 128, and 129 via one or more optical links of circuit board 110. More specifically, processor element package 121 is operatively coupled to processor element packages 122 and 123 via optical link 131 and to processor element package 124 via optical link 141; processor element package 122 is operatively coupled to processor element packages 121 and 123 via optical link 131 and to processor element package 125 via optical link 142; processor element package 123 is operatively coupled to processor element packages 121 and 122 via optical link 131 and to processor element package 126 via optical link 143; processor element package 124 is operatively coupled to processor element package 121 via optical link 141, to processor element packages 125 and 126 via optical link 132, and to processor element package 127 via optical link 151; processor element package 125 is operatively coupled to processor element package 122 via optical link 142, to processor element packages 124 and 126 via optical link 132, and to processor element package 128 via optical link 152; processor element package 126 is operatively coupled to processor element package 123 via optical link 143, to processor element packages 124 and 125 via optical link 132, and to processor element package 129 via optical link 153; processor element package 127 is operatively coupled to processor element packages 128 and 129 via optical link 133 and to processor element package 124 via optical link 151; processor element package 128 is operatively coupled to processor element packages 127 and 129 via optical link 133 and to processor element package 125 via optical link 152; and processor element package 129 is operatively coupled to processor element packages 127 and 128 via optical link 133 and to processor element package 126 via optical link 153.

Although a specific example of a topology of optical links is illustrated in FIG. 1, other topologies of optical links can be used within a composite processor. That is, although FIG. 1 illustrates point-to-point optical links (e.g., optical links 141 and 153) and group optical links (e.g., optical links 131 and 133), composite processor 100 can include other arrangements of optical links. For example, each processing element processor of composite processor 100 can be operatively coupled to a common optical link. In other words, a single optical link can be operatively coupled to each processor element package of a composite processor. Alternatively, a composite processor can include other point-to-point optical links and/or group optical links than those illustrated in FIG. 1. Moreover, a composite processor can include more or fewer processor element packages than illustrated in FIG. 1.

As illustrated in FIG. 1, an optical link can include multiple channels or interconnects. More specifically, for example, optical link 153 is illustrated in detail and includes optical channels 154, 155, and 156. Optical channels 154 and 155 can be used to transmit data (or symbols representing data) from processor element package 126 to processor element package 129, and optical channel 156 can be used to transmit data from processor element package 129 to processor element package 126.

Optical channels 154, 155, and 156 can be, for example, physical channels such as separate optical waveguides within optical link 153. Alternatively, for example, optical link 153 can be an optical waveguide such as a dense wavelength division multiplexing ("DWDM") optical waveguide (i.e., an optical waveguide that supports propagation of DWDM optical energy or signals representing data symbols) and optical channels 154, 155, and 156 can be wavelengths of optical energy within optical link 153. In other words, optical channels 154, 155, and 156 can be logical optical channels (i.e., represent wavelengths of optical energy that are supported within optical link 153).

Other optical links can include more or fewer optical channels than the three optical channels illustrated within optical link 153. For example, optical link 132 can include six optical channels. As a specific example, optical link 132 can include two optical channels via which processor element package 124 receives data, two optical channels via which processor element package 125 receives data, and two optical channels via which processor element package 126 receives data.

In some examples, multiple optical channels within an optical link can be provisioned dynamically (i.e., during operation of a composite processor). As a specific example of dynamically provisioning optical channels, processor element package 129 can include a digital signal processing ("DSP") unit, processor element package 126 can include a multi-core central processor unit, and a mathematics software application can be hosted at composite processor 110. During typical execution of the software application at composite processor 110, processor element package 126 provides operand values and commands to processor element package 129 via optical channel 154, and processor element package 129 provides results to processor element 126 via optical channel 155. Optical channel 156 is disabled. However, when a mathematic operation or procedure for which processor element package 129 is optimized (e.g., processor element package 129 includes logic to efficiently execute the mathematic operation) such as a Fast Fourier Transform ("FFT") or large matrix operation is requested by a user of the software application, optical channels 154, 155, and 156 are temporarily reconfigured. For example, processor element package 126 can send a command or instruction to processor element package 129 to indicate that processor element package will use each of optical channels 154, 155, and 156 to provide operant values for the mathematic operation of processor element package 129.

In response to the request, the operand values for the mathematic operation are provided from processor element package 126 to processor element package 129 via each of optical channels 154, 155, and 156 in parallel. After processor element package 126 completes the mathematic operation, the results are provided to processor element package 126 via each of optical channels 154, 155, and 156 in parallel. Moreover, optical channels 154, 155, and 156 are configured to their typical operational states after the results have been communicated to processor element package 126. In other words, optical channels can be dynamically provisioned to, for example, increase a data throughput rate.

In some examples, optical channels can be dynamically provisioned to alter communication paths within a composite processor. For example, optical link 133 can include six optical channels via which processor element packages 127, 128, and 129 can communicate one with another. At one time, a software module such as an operating system hosted at composite processor 110 can configure processor element package 127 to receive data from processor element packages 128 and 129 via four optical channels and send data to processor element packages 128 and 129 via two optical channels. At a later time, the operating system can configure each of processor element packages 127, 128, and 129 to receive data via two optical channels. That is, processor element package 127 receives data from processor element package 128 via a first optical channel and from processor element package 129 via a second optical channel; processor element package 128 receives data from processor element package 127 via a third optical channel and from processor element package 129 via a fourth optical channel; and processor element package 129 receives data from processor element package 127 via a fifth optical channel and from processor element package 128 via a sixth optical channel. Moreover, in some examples, one or more optical channels can be disabled when these optical channels are not used to transfer data to, for example, reduce energy consumption of a composite processor. Thus, the optical communication pathways within composite processor 110 can be dynamically provisioned to, for example, respond to time-varying workloads or to optimize power consumption or resource utilization.

Such dynamic provisioning also allows a common circuit board to be combined with various topologies of processor element packages to realize different composite processors. For example, a circuit board design can include a global optical link (i.e., an optical link with which each processor element package of a composite processor is in optical communication) including a group of optical channels. Various groups (e.g., types and numbers) of processor element packages can be coupled to circuit boards conforming to that circuit board design and can be configured dynamically to communicate one with another via particular optical channels to realize various composite processors. The processor element packages can be configured dynamically by, for example, accessing a predetermined or preselected optical channel via which configuration parameters (e.g., provisioning information) are distributed. Alternatively, for example, an electrical interface such as a peripheral bus (e.g., Inter-Integrated Circuit ("I²C"), 1-wire, or Serial Peripheral Interface ("SPI") bus) to which the processor element packages are coupled (e.g., via electrical couplers) can be accessed to distribute configuration parameters among the processor element packages. In other words, the processor element packages can be configured to communicate one with another via particular optical channels of the optical link to realize a logical communications interconnect network that is independent of the physical layout of the processing element packages at the composite processor.

Additionally, circuit board 110 can include electrical links (not shown) to provide, for example, operational energy or power to processor element packages 121, 122, 123, 124, 125, 126, 127, 128, and 129. For example, circuit board 110 can include electrically conductive traces that provide an operational voltage and a ground reference to processor element packages 121, 122, 123, 124, 125, 126, 127, 128, and 129. In some examples, circuit board 110 can include electrical links that each provide an operational voltage such as 12V, 5V, 3.3V, 2.7V, and/or 1.8V or a ground reference to processor element packages 121, 122, 123, 124, 125, 126, 127, 128, and 129 to satisfy various operational voltage requirements of processor element packages 121, 122, 123, 124, 125, 126, 127, 128, and 129.

Furthermore, circuit board 110 can include couplers (not shown) such as electrical couplers (e.g., pins, pads, or other conductors) via which composite processor 100 can interact (e.g., communicate) with external (or peripheral) devices. For example, composite processor 100 can be mounted (or coupled) to a motherboard via pins (not shown) at circuit board 110 within a computer server and can execute an operating system and/or application programs (software modules) stored as object code at a processor-readable medium of the computer server. Alternatively, composite processor 100 can include interfaces such as a Small Computer System Interconnect ("SCSI") interface, an Ethernet interface, a Fiber Channel interface, a Serial Advanced Technology Attachment ("SATA") interface, a Universal Serial Bus ("USB") interface, a Peripheral Component Interconnect Local Bus ("PCI") interface, and/or other interfaces to communicate directly with peripheral devices of composite processor 100. Such interfaces can be implemented at or in connection with one or more of processor element packages 121, 122, 123, 124, 125, 126, 127, 128, and 129.

As a specific example, a composite processor can integrate functional blocks or units that realize widely varying functionalities. Thus, a composite processor can be similar to a system-on-chip ("SoC"). However, the functional blocks of a composite processor are implemented at processor element packages and coupled optically rather than at a single integrated circuit and coupled electrically as an SoC.

For example, one or more processor element packages of a composite processor can include function units such as analog-to-digital converters ("ADCs"), digital-to-analog converters ("DACs"), USB interfaces, peripheral busses, network switches, timer modules, clock (e.g., real-time clock) modules, digital signal processing ("DSP") cores implementing specialized or generic DSP functionalities, memory multiplexers, and/or other functional units. Such functional units can be referred to generically (with other processor units discussed herein) as processor units. In other words, a composite processor can include processor element packages that include processor units to interpret instructions or codes to realize a software module, processor element packages that include processor units to process, operate on and/or transform data, processor element packages that include processor units to communicate with other devices (e.g., USB, SPI, etc.), and/or processor element packages that include other processor units. Said differently, a composite processor can include processor element packages implementing a diverse set of functionalities to realize a complex system at a single composite processor.

Each of processor element packages 121, 122, 123, 124, 125, 126, 127, 128, and 129 performs one or more processing functions to collectively implement a processor at composite processor 100. For example, processor element package 121 can include a multi-core central processor unit (i.e., an integrated circuit implementing a multi-core central processor unit at a substrate), processor element package 122 can include a cache memory, processor element package 123 can include a graphic processor unit, and processor element package 124 can include a floating-point unit. Processor element package 121 communicates with a processor readable medium to access instructions or operational codes and can perform operations based on those instructions. Processor element package 121 caches, for example, data values at processing element processor 122 by optically communicating (i.e., by exchanging optical signals without intermediate conversion such as optical-to-electrical and/or electrical-to-optical conversion at one or more opto-electronic elements) with processor element package 122 via optical link 131. That is, processor element package 121 does not include a cache memory and, rather, uses processor element package 122 as a cache memory.

Additionally, when processor element package 121 accesses at the processor-readable medium one or more instructions related to graphic processing, processor element package 121 can provide that instruction (or another command) to processor element package 123 via optical link 131. Processor element package 123 can then interpret that instruction (or other command), perform one or more operations based on that instruction, and provide a result to processor element package 121 via optical link 131. In other words, processor element package 123 rather than processor element package 121 handles (or provides support for) graphical processing.

Furthermore, when processor element package 121 accesses at the processor-readable medium one or more instructions related to a floating-point operation, processor element package 121 can provide that instruction (or another command) to processor element package 124 via optical link 141. Processor element package 124 can then interpret that instruction (or other command), perform one or more operations based on that instruction, and provide a result to processor element package 121 via optical link 141. In other words, processor element package 124 rather than processor element package 121 handles floating-point processing.

Moreover, processor element package 125 can include a multi-core central processor unit and be in communication with processor element package 121 via a shared memory portion of the cache memory at processor element package 122. Processor element package 121 can provide instructions to processor element package 125 via optical link 131, processor element package 122, and optical link 142. Processor element package 125 can interpret those instructions, perform one or more operations based on those instructions, and provide a result to processor element package 121 via optical link 142, processor element package 122, and optical link 131. In other words, processor element package 125 can operate as (or be) a coprocessor of processor element package 121. Similarly, processor element packages 126, 127, 128, and 129 can include other coprocessor units.

Composite processor 100, therefore, operates as a distributed or disaggregated processor in which processor element packages 121, 122, 123, 124, 125, 126, 127, 128, and 129 each perform various operations or functionalities and are in communication on with another via one or more optical links. In other words, processor element packages 121, 122, 123, 124, 125, 126, 127, 128, and 129 do not each implement all the operations or functionalities available at composite processor 100. Rather, each of processor element packages 121, 122, 123, 124, 125, 126, 127, 128, and 129 implements a subset or portion of the operations or functionalities available at composite processor 100. In other words, composite processor 100 can perform a wide range of operations or functionalities by including various processor element packages that individually implement only a portion of those operations or functionalities. Thus, each processor element package of composite processor 100 can be less complex and less expensive than a conventional processor that includes processor units to implement many or all of the operations or functionalities available at composite processor 100.

Furthermore, because each processor element package is separate from the other processor element package, a composite processor can be customized or application-specific by selecting processor element packages that are useful for a particular task or device (i.e., the processor element packages that include processor units that are useful to that task, application, or device), producing a circuit board that includes the optical links and/or electrical links to allow selected processor element packages to communicate one with another, and mounting the selected processor element packages on the circuit board such that the selected processor element packages are aligned with the appropriate optical links and/or electrical links. Additionally, performance of such composite processors can be acceptable because the processor element packages communicate optically one with another and avoid conversions of optical signals to other signals as discussed in more detail below.

Figure 2A:
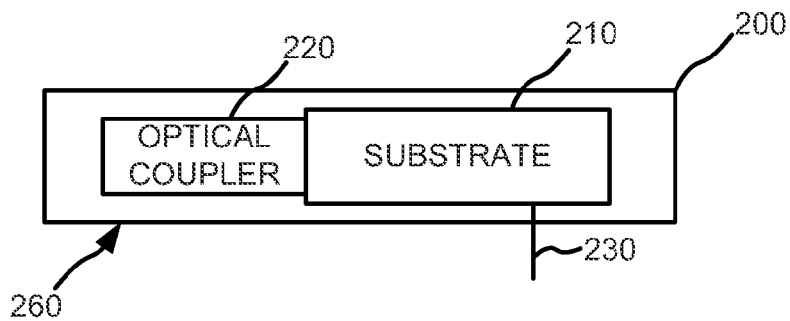
FIGS. 2A, 2B, and 2C are schematic block diagrams of a processor element package, according to one or more examples.
Figure 2B:
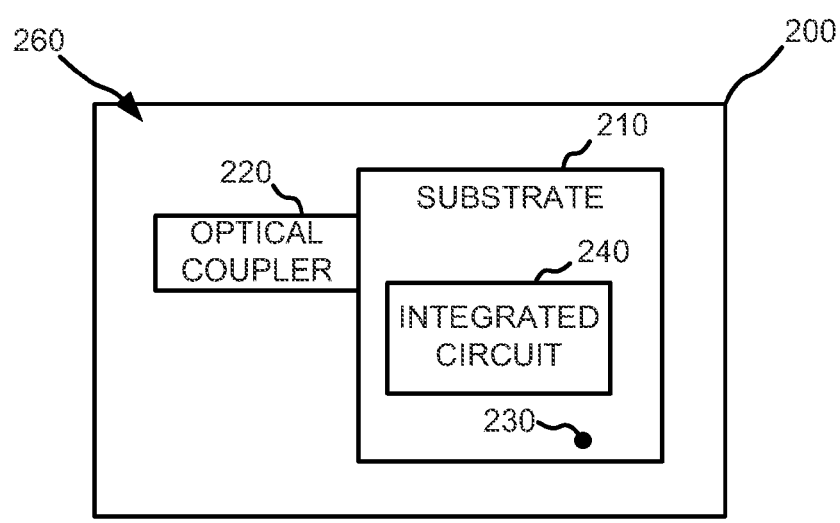
Figure 2C:
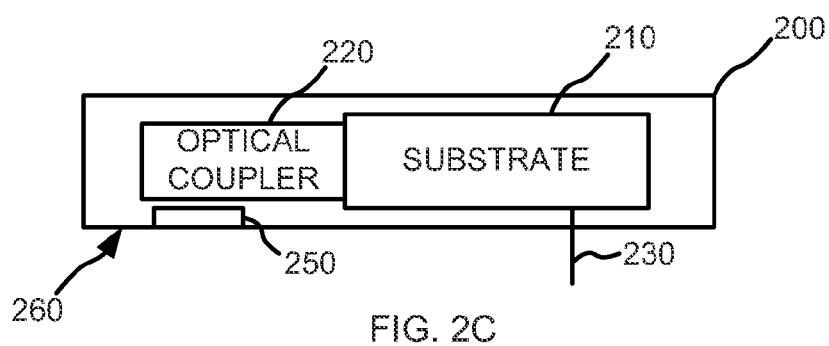

FIGS. 2A, 2B, and 2C are schematic block diagrams of a processor element package, according to one or more examples. FIG. 2A illustrates a side perspective view of processor element package 200. Processor element package 200 includes substrate 210, optical coupler 220, and electrical coupler 230. Bottom face 260 of processing element 200 is illustrated for reference and orientation with respect to FIGS. 2B and 2C.

As discussed above, optical coupler 220 is a portion of processor element package 200 that provides a path for optical energy or signals from outside processor element package 200 to substrate 210. In other words, optical coupler 220 is coupled to substrate 210 such that optical signals can be exchanged between optical coupler 220 and substrate 210 without an intermediate conversion to, for example, electrical signals. Said differently, optical coupler 220 is a passive optical coupler. For example, optical coupler 220 can be an optical fiber or optical waveguide directly coupled to substrate 210. Alternatively, for example, optical coupler 220 can be an optical waveguide included within or at substrate 210.

Similarly, electrical coupler is a portion of processor element package 200 that provides a path for electrical energy or signals from outside processor element package 200 to substrate 210. For example, electrical coupler 230 can be an electrically conductive pin or pins of processor element package 200 that is coupled to substrate 210.

FIG. 2B illustrates a bottom perspective view of processor element package 200. As illustrated in FIG. 2B, integrated circuit 240 is included at substrate 210. For example, substrate 210 can be a silicon substrate and integrated circuit can be an opto-electronic circuit manufactured at substrate 210. In some examples, multiple integrated circuits can be implemented at substrate 210. Moreover, processor element package 200 can include multiple substrates, each having an integrated circuit.

FIG. 2C illustrates a side perspective view of processor element package 200. As illustrated in FIG. 2C, processor element package 200 includes lens 250. Lens 250 can be used to define or alter an optical communications path (also referred to herein as an "optical path") between optical coupler 220 and an optical source or detector external to processor element package 200. Because processor element package 200 will typically be mounted or coupled to a circuit board such that bottom face 260 is adjacent to the circuit board, a thin and substantially planar lens 250 can be particularly advantageous.

Figure 3:
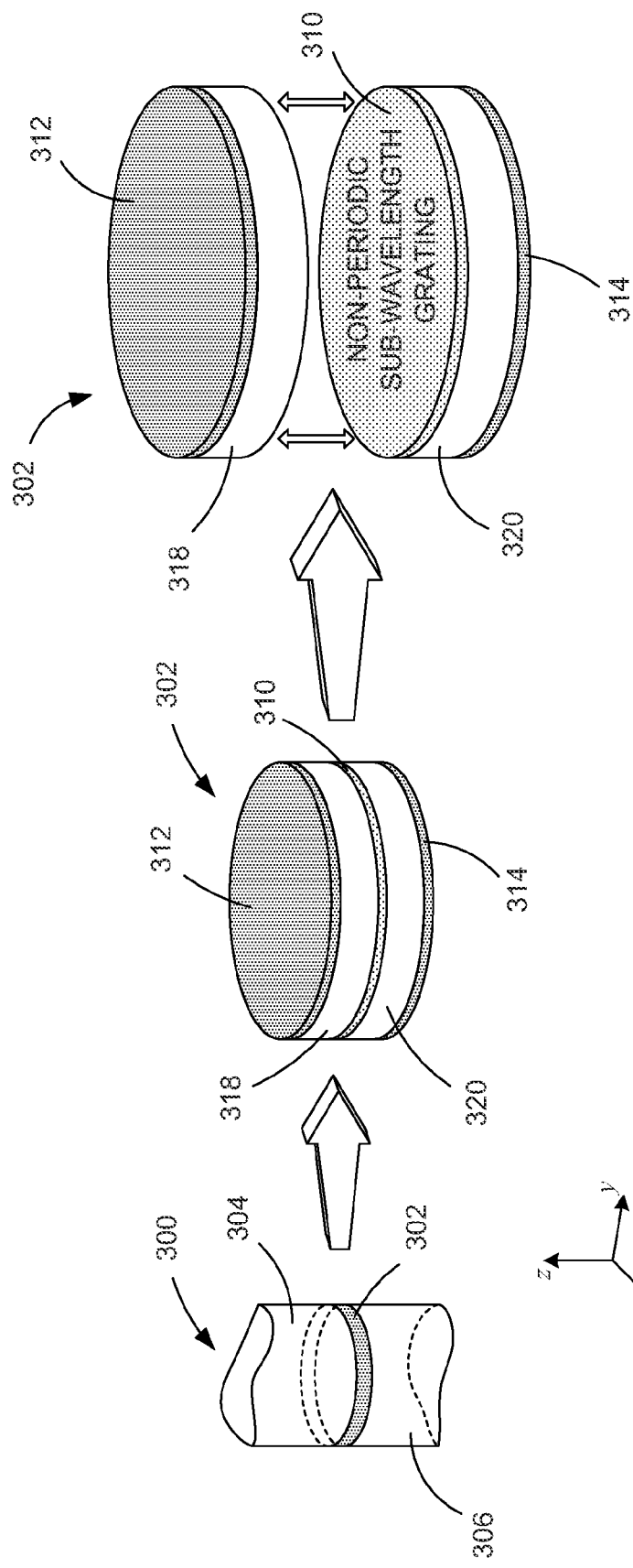
FIG. 3 illustrates a planar lens, according to an example.

For example, lens 250 can be a planar lens with one or more non-periodic, sub-wavelength gratings or non-periodic, sub-wavelength grating layers. FIGS. 3-11 illustrate planar lenses. FIG. 3 illustrates a planar lens, according to an example. Portion 300 includes planar lens 302 disposed between portions of two dielectric layers 304 and 306. FIG. 3 shows an enlargement of planar lens 302 revealing the layered structure of planar lens 302. Planar lens 302 includes approximately planar sub-wavelength grating layer 310 disposed between two approximately parallel and planar reflective layers 312 and 314. In some examples, a planar lens does not include one or both of reflective layers 312 and 314. FIG. 3 also shows an exploded isometric view with layer 318 separated from sub-wavelength grating layer 310. Sub-wavelength grating layer 310 includes a sub-wavelength grating pattern, described in greater detail below. Spacer layer 318 separates sub-wavelength grating layer 310 from reflective layer 312, and spacer layer 320 separates sub-wavelength grating layer 310 from reflective layer 314. Sub-wavelength grating layer 310 and reflective layer 312 are separated by lower refractive index spacer layer 318 to form a first resonant cavity, and sub-wavelength grating layer 310 and reflective layer 314 are also separated by spacer layer 320 to form a second resonant cavity, for appropriate modes of incident electromagnetic radiation. In other words, the sub-wavelength grating layer 310 separates the first and second optical cavities.

Sub-wavelength grating layer 310 can be composed of any suitable semiconductor material, such as silicon ("Si"), gallium arsenide ("GaAs"), or indium phosphide ("InP"). Sub-wavelength grating layer 310 can also be composed of a dielectric material, such as silicon carbide ("SiC"). Dielectric layers 304 and 306 can be composed of a dielectric material, such as Al2O3, or SiO2, or a suitable polymer having a low refractive index. In some examples, one or more of dielectric layers 304 and/or 306 can be excluded from a processor element package. Reflective layers 312 and 314 can be composed of a dielectric material; a semiconductor; or a metal, such as gold ("Au") or silver ("Ag"). Spacer layers 318 and 320 can be composed of a suitable polymer or another dielectric material, the polymer and the dielectric material having a lower refractive index than layers 310, 312, and 314.

A planar lens can be fabricated using, for example, deposition and lithographic techniques. A first reflective layer can be formed on dielectric layer using wafer bonding, chemical vapor deposition ("CVD"), or physical vapor deposition ("PVD"). A first spacer layer can then be deposited on the reflective layer using spin-on glass, CVD, or PVD. A sub-wavelength grating layer is deposited on the surface of the spacer layer using wafer bonding, CVD, or PVD. A non-periodic, sub-wavelength grating can be formed in the sub-wavelength grating layer using reactive ion etching, focused ion beam milling, nanoimprint lithography, or any other suitable technique for forming a non-periodic, sub-wavelength grating pattern in the sub-wavelength grating layer. A second spacer layer can be deposited over the sub-wavelength grating layer using spin-on glass, CVD, or PVD followed by deposition of a second reflective layer using CVD or PVD.

Planar lenses can be configured to apply a particular phase change to transmitted light. In particular, the sub-wavelength grating layer 310 illustrated in FIG. 3 can be configured with a one-dimensional grating pattern to apply a phase change to transmitted light polarized substantially perpendicular to the lines, as described below with reference to FIGS. 4-6.

Figure 4:
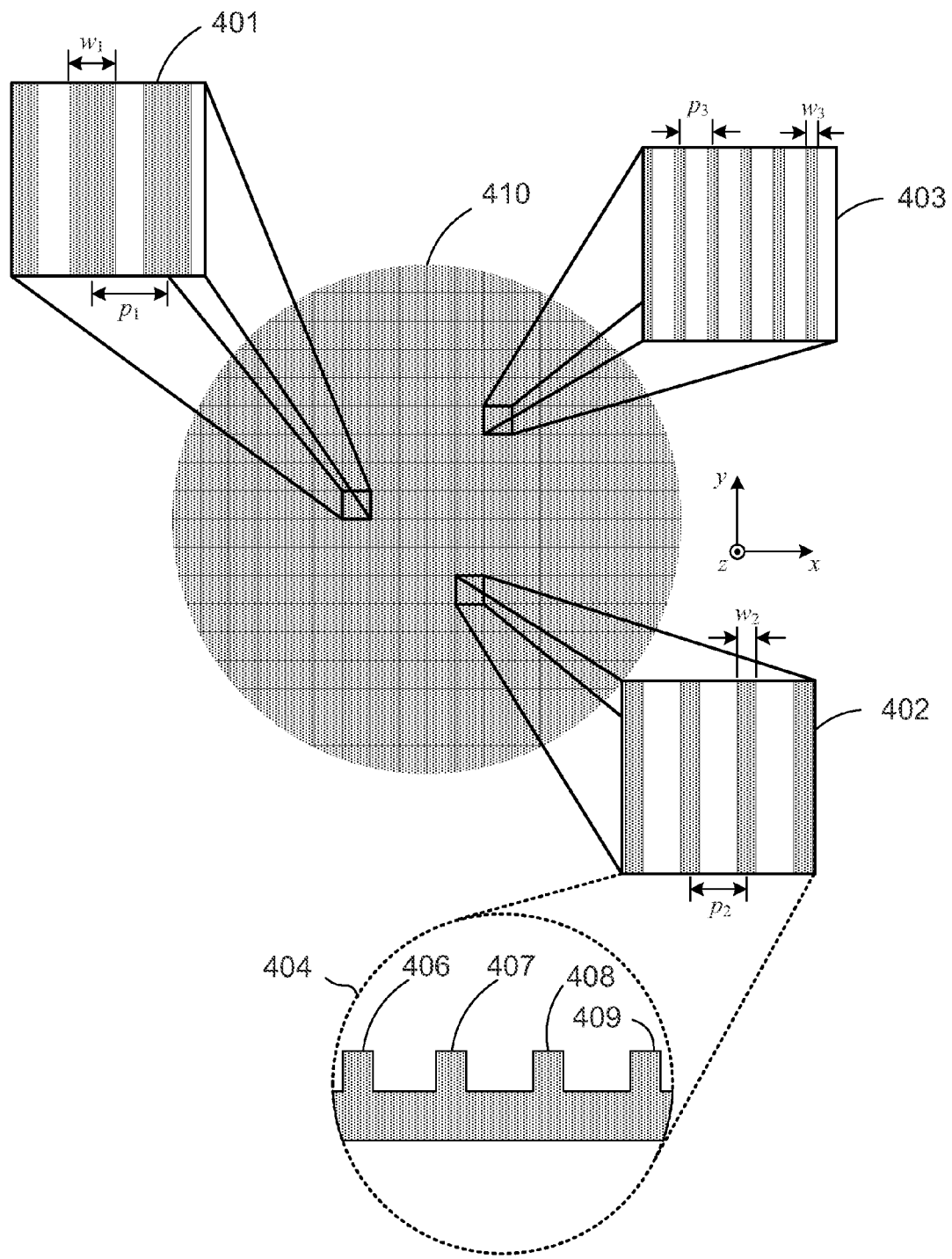
FIG. 4 illustrates a top perspective view of a non-periodic, sub-wavelength grating layer of a planar lens, according to an example.

FIG. 4 illustrates a top perspective view of a non-periodic, sub-wavelength grating layer of a planar lens, according to an example. A one-dimensional grating pattern is composed of a number of one-dimensional grating sub-patterns. In the example of FIG. 4, three exemplary grating sub-patterns 401, 402, and 403 are enlarged. Each grating sub-pattern comprises a number of regularly spaced wire-like portions of sub-wavelength grating layer 410 material referred to as "lines." The lines extend in the y-direction and are periodically spaced in the x-direction. FIG. 4 also includes enlarged end-on view 404 of grating sub-pattern 402. In end-on view 404, sub-wavelength grating layer 410 can be a single layer with lines, such as lines 406, 407, 408, and 409, separated by grooves formed in the layer.

As shown in the example of FIG. 4, each sub-pattern is characterized by a particular periodic spacing of the lines and by the line width in the x-direction. For example, sub-pattern 401 comprises lines of width $w_1$ periodically spaced with a period $p_1$, sub-pattern 402 comprises lines with width $w_2$ periodically spaced with a period $p_2$, and sub-pattern 403 comprises lines with width $w_3$ periodically spaced with a period $p_3$. The grating sub-patterns 401, 402, and 403 form sub-wavelength gratings that preferentially reflect incident light polarized in one direction, e.g. light polarized in the x-direction, provided the periods $p_1$, $p_2$, and $p_3$ are smaller than the wavelength of the incident light. For example, the line widths can range from approximately 10 nm to approximately 300 nm and the periods can range from approximately 20 nm to approximately 1 μm depending on the wavelength of the light incident on planar lens 302 illustrated in FIG. 3. The light reflected from a sub-region acquires a phase φ determined by the line thickness t, and the duty cycle η defined by:

$$\eta = \frac{w}{p},$$

where w is the line width and p is the period of the lines associated with the region.

Each of grating sub-patterns 401, 402, and 403 also reflect incident light polarized in one direction differently due to the different duty cycles and periods associated with each of the sub-patterns. For example, sub-wavelength grating layer 410 can be configured to reflect the x-polarized component or the y-polarized component of the incident light by adjusting the period, line width, and line thickness of the lines. More specifically, for example, a particular period, line width and thickness can be suitable for reflecting the x-polarized component of light but not be suitable for reflecting the y-polarized component; and a different period, line width, and line thickness can be suitable for reflecting the y-polarized component but not be suitable for reflecting the x-polarized component.

Figure 5:
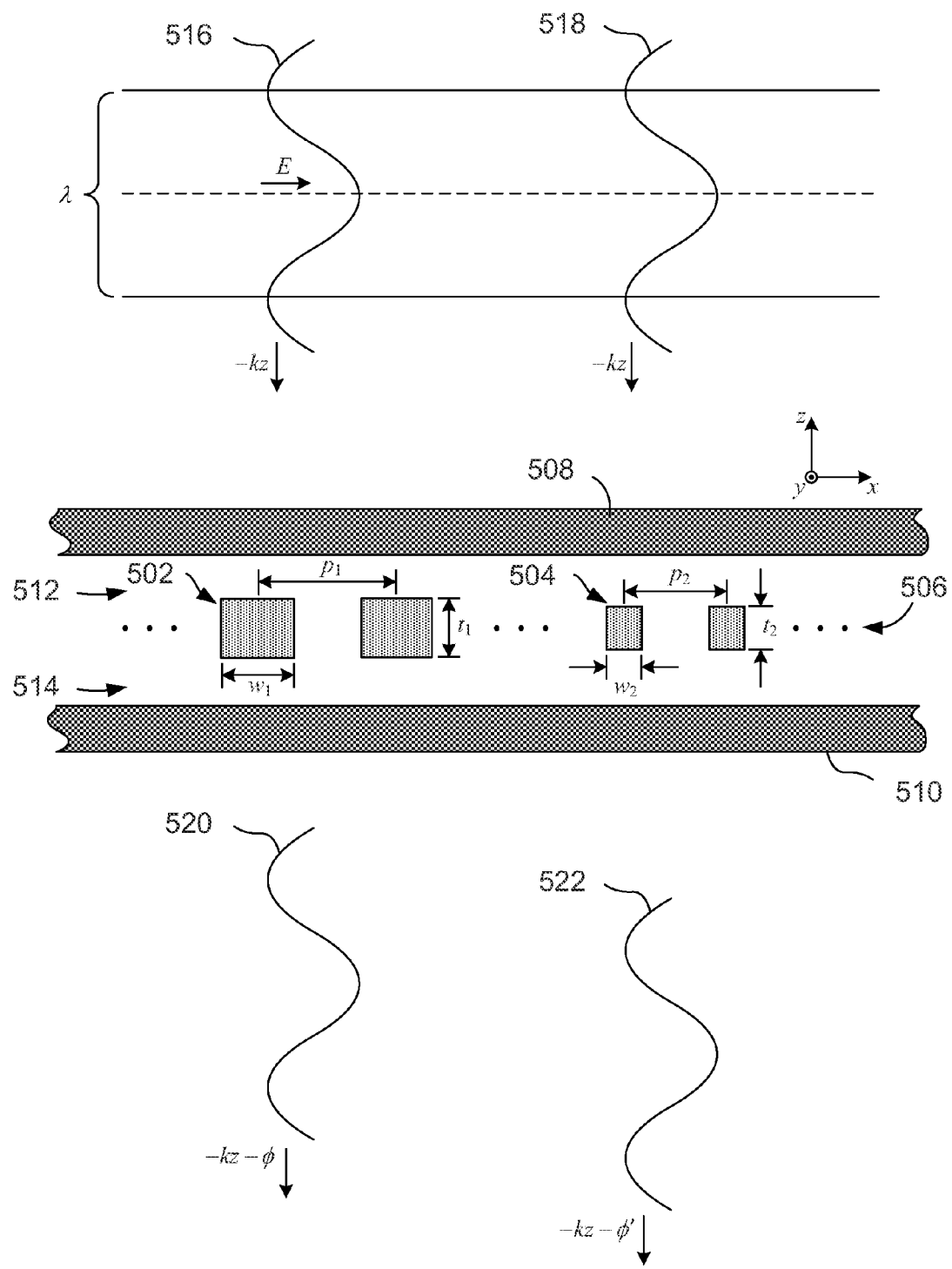
FIG. 5 illustrates a cross-sectional perspective view of planar lens, according to an example.

FIG. 5 illustrates a cross-sectional perspective view of a planar lens, according to an example. More specifically, FIG. 5 shows a cross-sectional view of a planar lens revealing portions of two separate grating sub-patterns 502 and 504 of sub-wavelength grating layer 506 disposed between first reflective layer 508 and second reflective layer 510. Sub-patterns 502 and 504 can be located in different regions of sub-wavelength grating layer 506. The thickness $t_1$ of the lines of sub-pattern 502 are greater than the thickness $t_2$ of the lines of sub-pattern 504, and the duty cycle $\eta_1$ associated with the lines in sub-pattern 502 is greater than the duty cycle $\eta_2$ associated with the lines of sub-pattern 504. Light polarized in the x-direction and incident on the planar lens becomes trapped and oscillates for a period of time within resonant cavities 512 and 514. The light is ultimately transmitted through layers 506, 508, and 510, but with the portion of light transmitted through sub-region 502 acquiring a larger phase shift than the portion of light transmitted through sub-region 504. As shown in the example of FIG. 5, incident waves 516 and 518 strike the planar lens with approximately the same phase, but wave 520 transmitted through sub-pattern 502 acquires a relatively larger phase shift φ than the phase shift φ' (i.e., φ<φ') acquired by the wave 522 transmitted through the sub-pattern 504.

Figure 6:
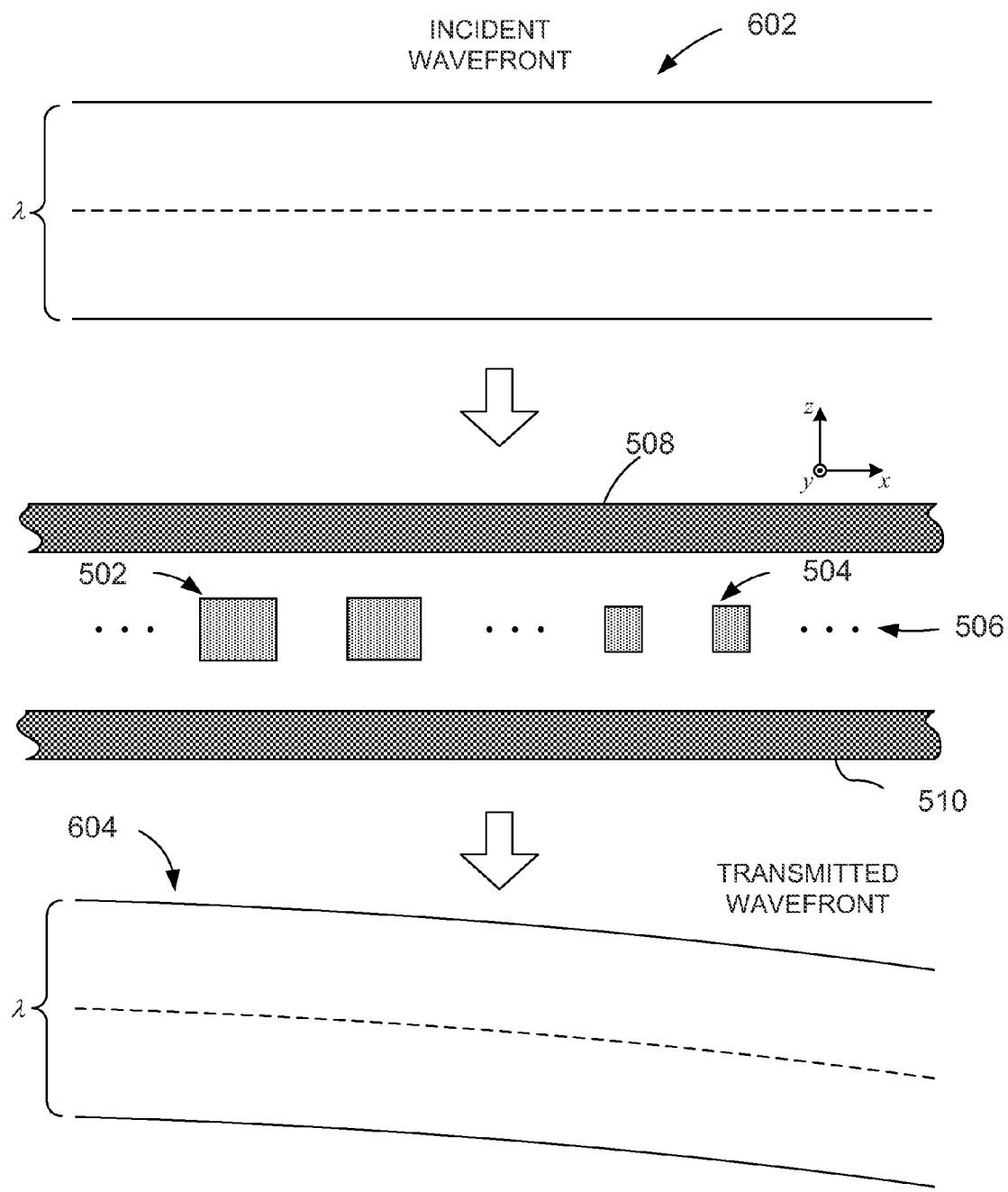
FIG. 6 illustrates a cross-sectional perspective view of a planar lens, according to an example.
Figure 7:
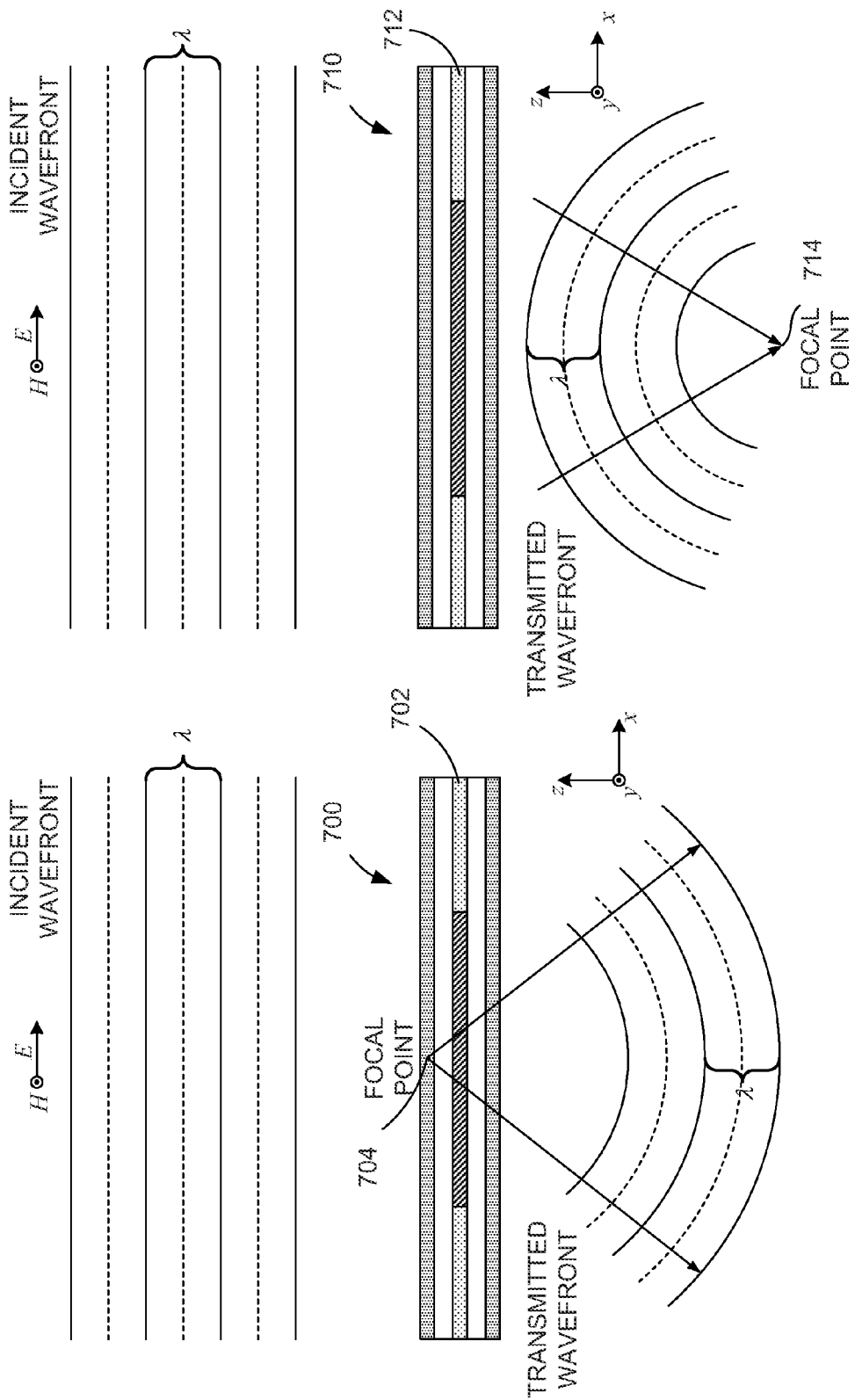
FIG. 7A illustrates a cross-sectional perspective view of a planar lens configured to produce divergent light, according to an example.
FIG. 7B illustrates a cross-sectional perspective view of a planar lens configured to focus light onto a focal point, according to an example.

FIG. 6 illustrates a cross-sectional perspective view of a planar lens, according to an example. As shown in the example of FIG. 6, incident light with substantially uniform wavefront 602 strikes the planar lens defined by sub-wavelength grating layer 506 disposed between first reflective layer 508 and second reflective layer 510 producing transmitted light with curved transmitted wavefront 604. Transmitted wavefront 604 results from portions of incident wavefront 602 interacting with sub-region 502 with a relatively larger duty cycle and thickness $t_1$ than portions of incident wavefront 602 interacting with sub-region 504 with a relatively smaller duty cycle $\eta_2$ and thickness $t_2$. The shape of transmitted wavefront 604 is consistent with the larger phase acquired by light interacting with sub-region 502 relative to the smaller phase shift acquired by light interacting with sub-region 504.

FIG. 7A illustrates a cross-sectional perspective view of a planar lens configured to produce divergent light, according to an example. In particular, FIG. 7A shows a cross-sectional view of planar lens 700 with sub-wavelength grating layer 702 configured to diverge light as if the light emanated from focal point 704. In the example of FIG. 7A, the sub-wavelength grating of sub-wavelength grating layer 702 is configured with a non-periodic, sub-wavelength grating pattern that causes incident light polarized in the x-direction to be transmitted with a wavefront corresponding to the transmitted light diverging from focal point 704. FIG. 7B, however, illustrates a cross-sectional perspective view of a planar lens configured to focus light onto a focal point, according to an example. In particular, FIG. 7B shows a cross-sectional view of planar lens 710 with sub-wavelength grating layer 712 configured to focus light onto focal point 714. In the example of FIG. 7B, the sub-wavelength grating of sub-wavelength grating layer 712 is configured with a non-periodic, sub-wavelength grating pattern that causes incident light polarized in the x-direction to be transmitted with a wavefront corresponding to light directed to focal point 714.

Figure 8:
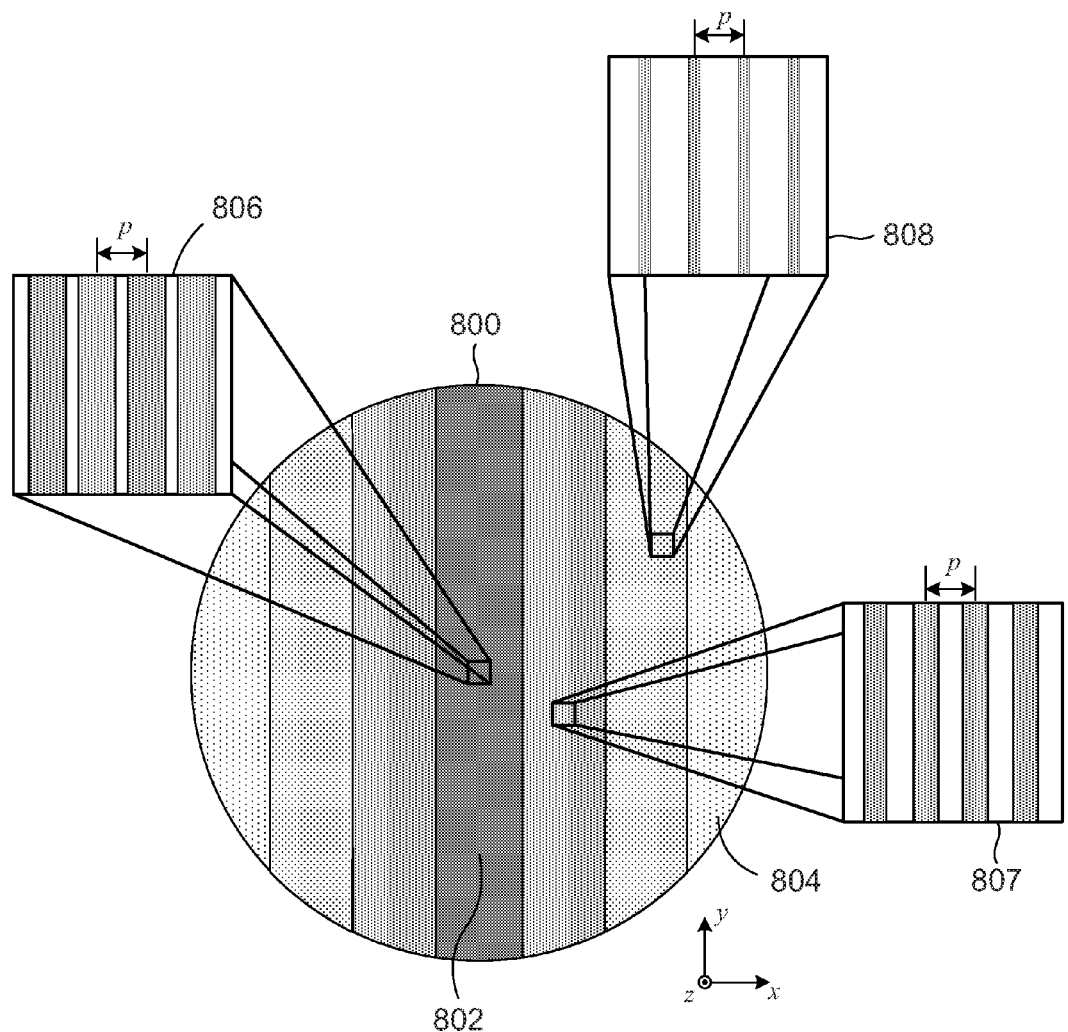
FIG. 8 illustrates a top perspective view of a non-periodic, sub-wavelength grating configured to operate as a convex lens for polarized incident light, according to an example.

In certain examples, the sub-wavelength grating layer can be configured so that the planar lens can be operated as a convex cylindrical lens. In the following example, changes in the duty cycle are achieved by varying the line width of the non-periodic sub-wavelength grating while holding the period constant. FIG. 8 illustrates a top perspective view of a non-periodic, sub-wavelength grating configured to operate as a convex lens for incident light polarized substantially parallel to the x-direction, according to an example. Each shaded region of the non-periodic sub-wavelength grating of non-periodic, sub-wavelength grating layer 800 represents a different grating sub-pattern of lines extending in the y-direction, with darker shaded regions, such as region 802, representing regions with a relatively larger duty cycle than lighter shaded regions, such as region 804. FIG. 8 includes enlargements 806, 807, and 808 of three sub-regions revealing that the lines run parallel in the y-direction and the line period spacing p is constant or fixed in the x-direction. Enlargements 806, 807, and 808 also reveal that the line width w, in other words the duty cycle η, decreases away from the center in the x-direction. The sub-wavelength grating layer 800 is configured so that light of an appropriate wavelength and polarized in the x-direction is transmitted through the planar lens and is focused at a focal line disposed along the y-direction.

Figure 9:
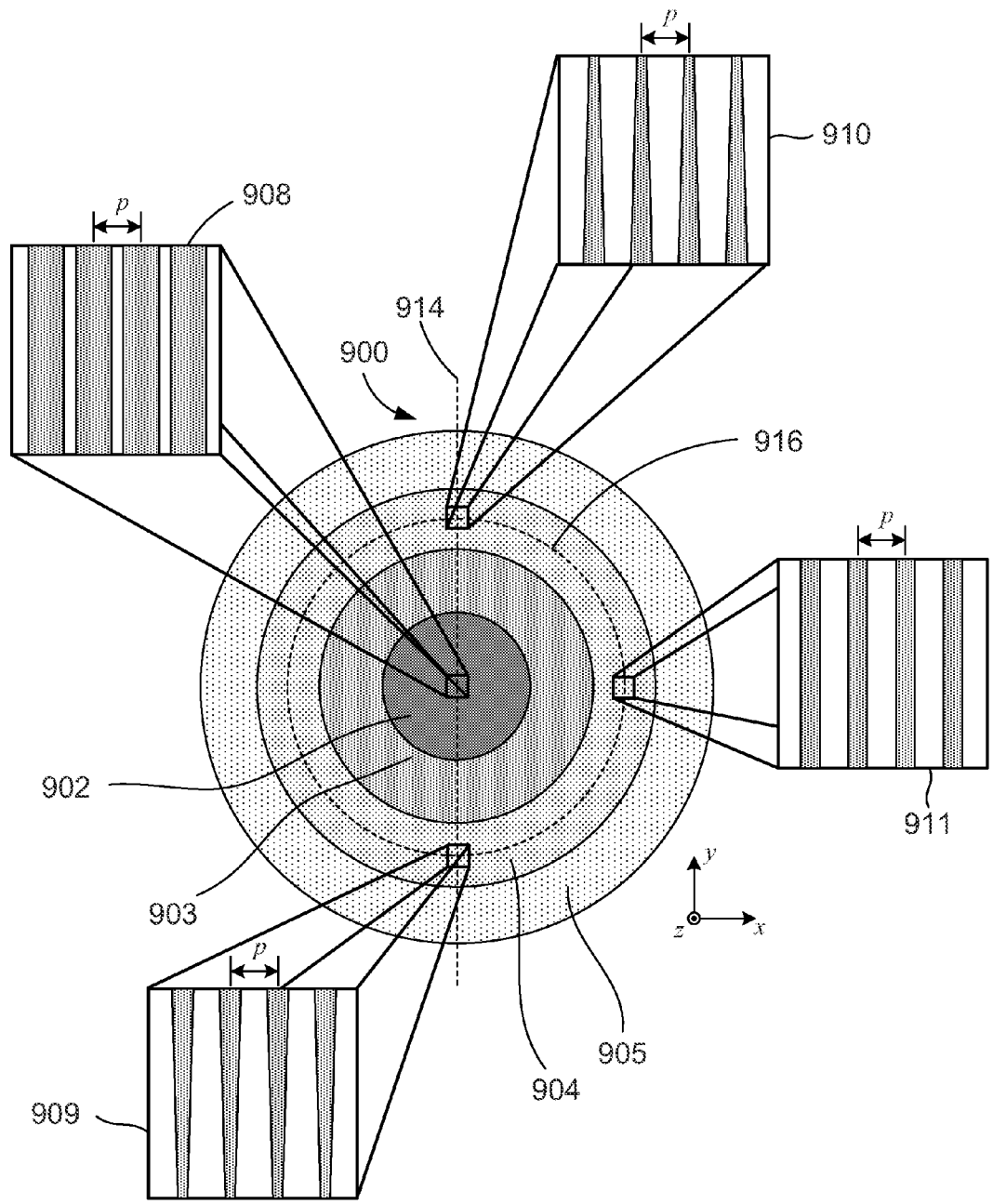
FIG. 9 illustrates a top perspective view of a non-periodic, sub-wavelength grating configured to operate as a convex lens for non-polarized incident light, according to an example.

In certain examples, the sub-wavelength grating layer can be configured so that the planar lens can be operated as a spherical convex lens for focusing incident light polarized in any direction by appropriately tapering the lines of the non-periodic, sub-wavelength grating away from the center of the sub-wavelength grating-layer. FIG. 9 illustrates a top perspective view of a non-periodic, sub-wavelength grating configured to operate as a convex lens for non-polarized (i.e., polarized in any direction) incident light, according to an example. Sub-wavelength grating layer 900 includes a non-periodic, sub-wavelength grating with a grating pattern represented by annular shaded regions 902, 903, 904, and 905. Each shaded annular region represents a different grating sub-pattern of lines. Enlargements 908, 909, 910, and 911 show that the non-periodic, sub-wavelength grating comprises lines tapered in the y-direction with a constant line period spacing p in the x-direction. In particular, enlargements 908, 909, and 910 are enlargements of the same lines running parallel to dashed-line 914 in the y-direction. Enlargements 908, 909, and 910 reveal that the line period spacing p remains constant but the width of the lines narrow or taper away from the center of the non-periodic, sub-wavelength grating in the y-direction.

Each annular region can have the same duty cycle and period. For example, enlargements 909, 910, and 911 reveal portions of annular region 904 comprising portions of different lines that have substantially the same duty cycle. As a result, each portion of such an annular region produces the same approximate phase shift in the light transmitted through the planar lens. For example, dashed circle 916 represents a single phase shift contour in which light transmitted through a planar lens including non-periodic, sub-wavelength grating layer 900 anywhere along circle 916 acquires substantially the same phase φ.

Figure 10:
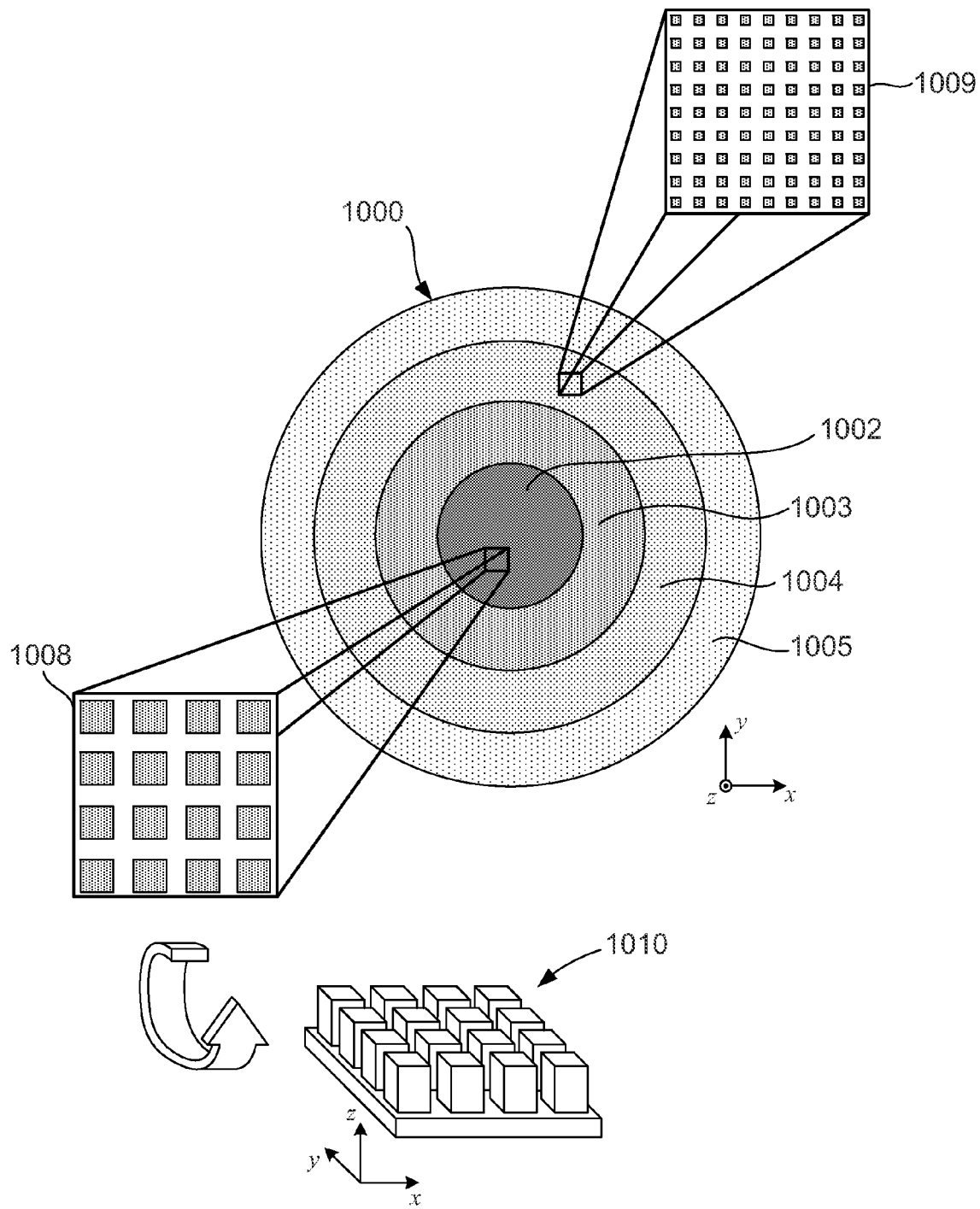
FIG. 10 illustrates a top perspective view of a two-dimensional grating pattern of a non-periodic, sub-wavelength grating layer, according to an example.
Figure 11:
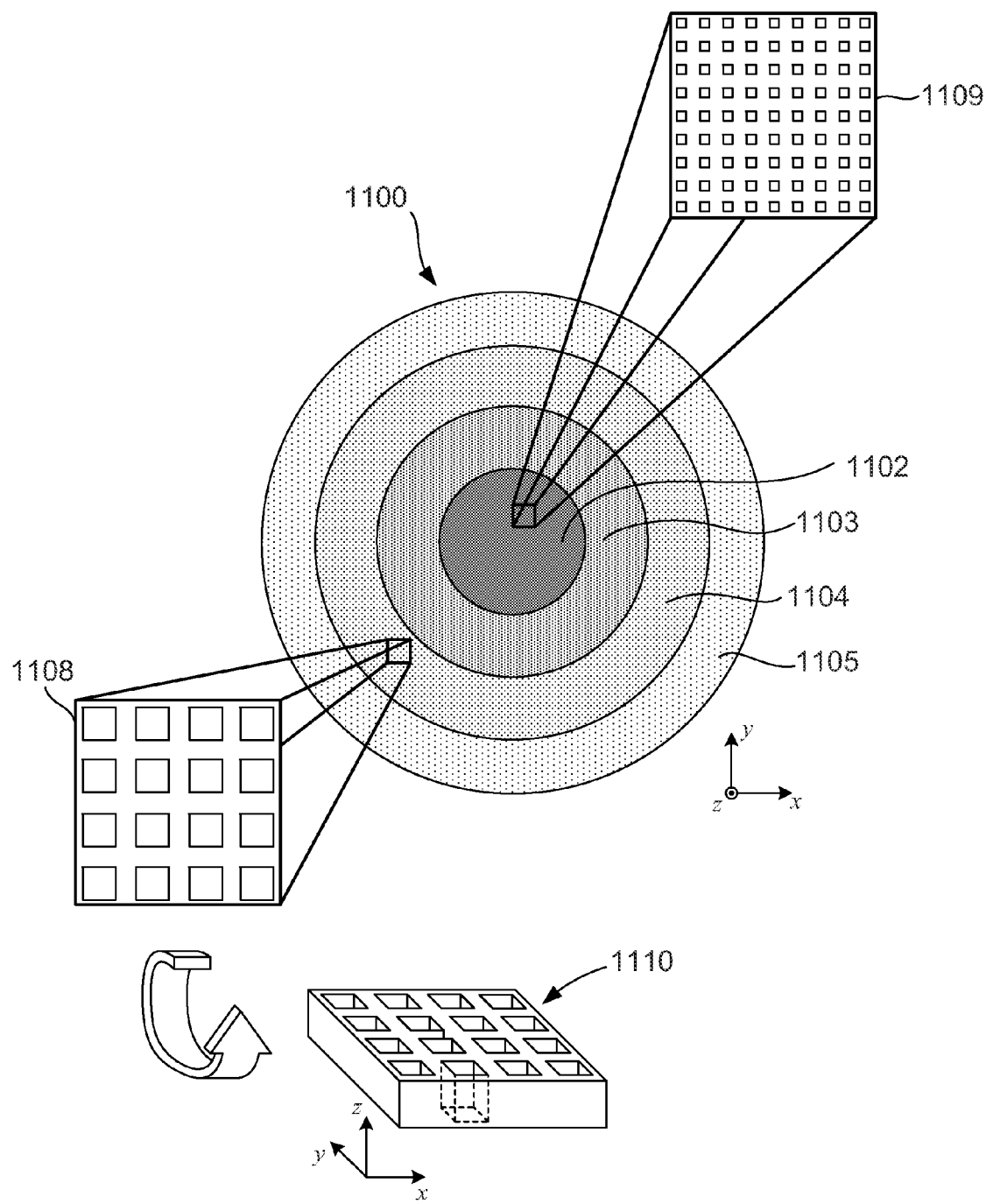
FIG. 11 illustrates a top perspective view of a two-dimensional grating pattern of a non-periodic, sub-wavelength grating layer, according to another example.

Examples are not limited to one-dimensional gratings. A sub-wavelength grating layer can be configured with a two-dimensional non-periodic, sub-wavelength grating so that the planar lens can be operated as a convex or concave lens. FIGS. 10 and 11 show top perspective views of two examples of two-dimensional grating patterns configured such that a planar lens can be operated as a convex lens for incident unpolarized light. In the example of FIG. 10, the non-periodic, sub-wavelength grating is composed of posts rather than lines separated by grooves. The duty cycle and period can be varied in the x- and y-directions. Sub-wavelength grating layer 1000 includes a non-periodic, sub-wavelength grating with a grating pattern represented by annular shaded regions 1002, 1003, 1004, and 1005. Each shaded annular region represents a different grating sub-pattern of posts. Enlargements 1008 and 1009 show two different post sizes, where the size of the posts decreases away from the center of the non-periodic, sub-wavelength grating. FIG. 10 includes an isometric view 1010 of posts comprising the enlargement 1008. The posts can be square, rectangular, circular, elliptical, or any other suitable shape.

In the example of FIG. 11, the non-periodic, sub-wavelength grating is composed of holes rather than posts. Sub-wavelength grating layer 1100 includes a non-periodic, sub-wavelength grating with a grating pattern also represented by annular shaded regions 1102, 1103, 1104, and 1105. Each shaded annular region represents a different grating sub-pattern of holes. Enlargements 1108 and 1109 show two different hole sizes, where the size of the holes increases away from the center of the non-periodic, sub-wavelength grating. FIG. 11 includes an isometric view 1110 of holes comprising the enlargement 1108. Although the holes shown in FIG. 11 are square-shaped, in other examples, the holes can be rectangular, circular, elliptical, or any other suitable shape.

Referring to FIG. 2C, such a planar lens included within processor element package 200 as lens 250 can be particularly beneficial to a composite processor. For example, such planar lenses can be manufactured to be sufficiently thin to fit within the dimensions of package form factors such as low-profile package form factors. Additionally, because such lenses are planar, the design of the composite processor need not accommodate curvature for a lens.

Figure 12A:
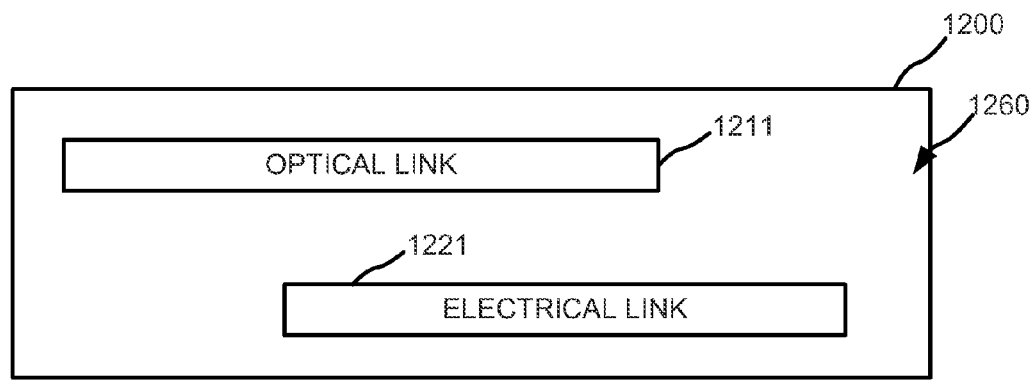
FIGS. 12A, 12B, 12C, 12D, 12E, and 12F are schematic block diagram views of a composite processor, according to one or more examples.

FIGS. 12A, 12B, 12C, 12D, 12E, and 12F are schematic block diagram views of a composite processor, according to an example. FIG. 12A shows a top perspective view of circuit board 1200 which includes optical link 1211 and electrical link 1221. Optical link 1211 can be any optical link that supports propagation of optical energy or optical signals. For example, optical link 1211 can be an optical fiber or optical waveguide. Electrical link 1221 can be any electrical link that supports propagation of electrical energy or electrical signals. For example, electrical link can be an electrically conductive trace within circuit board 1200. Top face 1260 is illustrated in FIGS. 12A, 12B, 12C, 12D, 12E, and 12F for reference and orientation with respect to FIGS. 12A, 12B, 12C, 12D, 12E, and 12F.

Figure 12B:
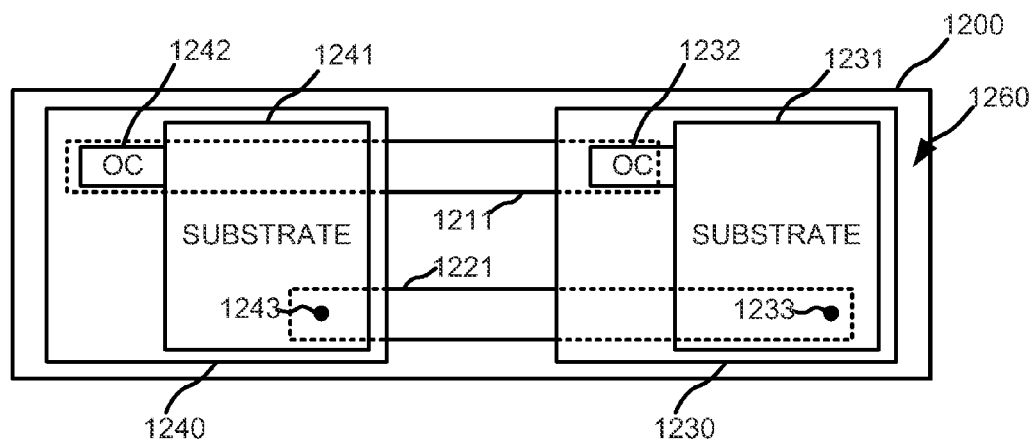

FIG. 12B shows a top perspective view of the composite processor with processor element packages 1230 and 1240 mounted or operatively coupled to circuit board 1200. Processor element package 1230 includes substrate 1231, optical coupler 1232, and electrical coupler 1233. Similarly, processor element package 1240 includes substrate 1241, optical coupler 1242, and electrical coupler 1243. Substrates 1231 and 1241 also include integrated circuits (not shown) implemented thereon. For example, processor element package 1230 can be a central processor unit package and processor element package 1240 can be a coprocessor package such as a floating-point package, a graphic processing package, or a communications interface package.

Figure 12C:
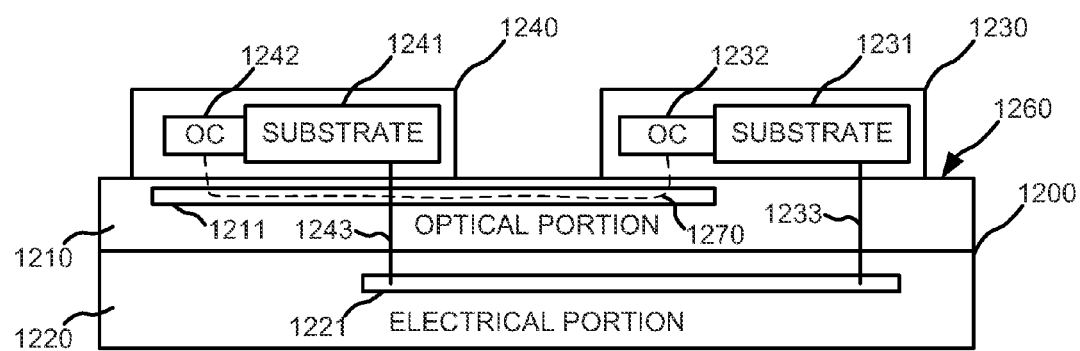

FIG. 12C shows a side perspective view of the composite processor. As illustrated in FIG. 12C, circuit board 1200 includes optical portion 1210 and electrical portion 1220. Optical portion 1210 can be any material or combination of materials that can support optical link 1211. For example, optical portion 1210 can be a layer of silicon or silicon oxide in which optical waveguides are defined. Electrical portion 1221 can be any material or combination of materials that support electrical link 1221. For example, electrical portion 1220 can be fiberglass and electrical link 1221 can be a copper trace bonded to electrical portion 1220.

As illustrated in FIG. 12C, optical coupler 1232, optical coupler 1242, and optical link 1211 collectively define optical communications path 1270 between substrate 1231 and substrate 1241. In other words, optical coupler 1232, optical coupler 1242, and optical link 1211 collectively allow optical signals to be exchanged between substrates 1231 and 1241. Furthermore, as illustrated in FIG. 12C, electrical couplers 1233 and 1243 are coupled to electrical link 1221 within electrical portion 1220. For example, electrical couplers 1233 and 1243 can be soldered to electrical link 1221 to receive operational energy via electrical link 1221.

Figure 12D:
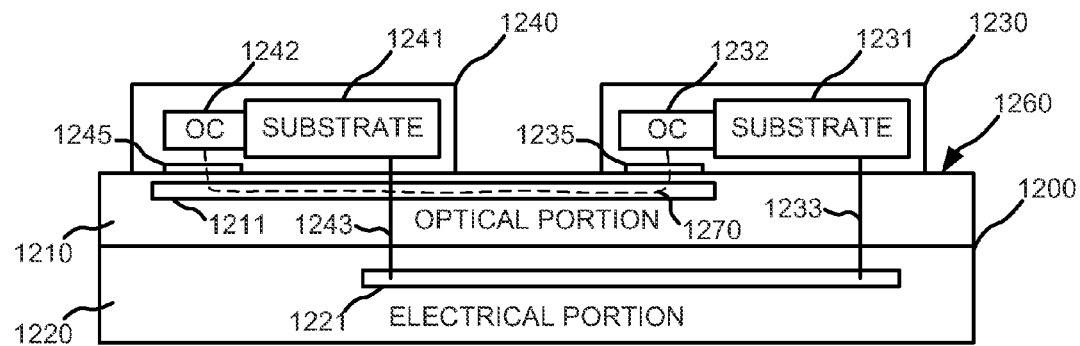

FIG. 12D also shows a side perspective view of the composite processor. In the example illustrated in FIG. 12D, processor element package 1230 includes planar lens 1235 and processor element package 1240 includes planar lens 1245. Planar lenses 1235 and 1245 can be planar lenses that include a sub-wavelength grating layer (i.e., sub-wavelength grating lenses) such as a non-periodic, sub-wavelength grating layer such as those discussed above in relation to FIGS. 3-11. Planar lenses 1235 and 1245 can be useful to alter optical signals between optical coupler 1232 and optical link 1211 and/or optical coupler 1242 and optical link 1211. For example, planar lenses 1235 and 1245 can focus optical signals from optical coupler 1232 into optical link 1211 and from optical link 1211 into optical coupler 1242. Said differently, optical coupler 1232, planar lens 1235, optical link 1211, planar lens 1245, and optical coupler 1242 can collectively define optical communications path 1270 between substrate 1231 and substrate 1241. In other words, optical coupler 1232, planar lens 1235, optical link 1211, planar lens 1245, and optical coupler 1242 collectively allow optical signals to be exchanged between substrates 1231 and 1241.

As illustrated in the example of FIGS. 12A-12D, a composite processor including two processor element packages is shown. Other embodiments including additional processor element packages can also be manufactured. For example, some composite processor can include tens, hundreds, or even thousands of processor element packages.

Figure 12E:
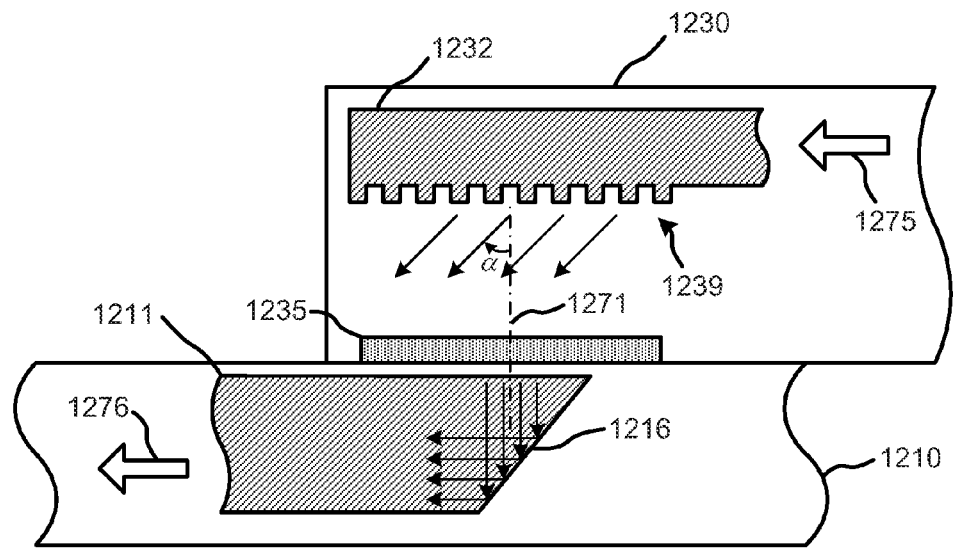

FIG. 12E is a magnified side perspective view of the composite processor that shows processor element package 1230 and optical portion 1210 of circuit board 1200. In the example illustrated in FIG. 12E, optical coupler 1232 includes sub-wavelength grating 1239. That is, optical coupler 1232 is a sub-wavelength grating optical coupler. Optical signals that propagate along optical coupler 1232 in the direction indicated by arrow 1275 are emitted from optical coupler 1232 at an angle α with respect to normal line 1271. Planar lens 1235 focuses the optical signals emitted from optical coupler 1232 such that the optical signals are parallel to normal line 1271 after propagating along planar lens 1235. Thus, planar lens 1235 focuses the optical signals onto surface 1216 (e.g., a total internal reflection surface) and the optical signals are reflected into optical link 1211. The optical signals then propagate along optical link 1211 in the direction indicated by arrow 1276. For example, the optical signals can propagate toward another processor element package such as processor element package 1240 illustrated in FIGS. 12A, 12B, 12C, and 12D.

The optical system defined by optical link 1211, surface 1216, lens 1235, and optical coupler 1232 can operate similarly when optical signals propagate in the direction opposite arrows 1275 and 1276. More specifically, optical signals incident on surface 1216 from optical link 1211 (i.e., optical signals propagating in optical link 1211 in a direction opposite arrow 1276) can be reflected at surface 1216 to be incident on lens 1235 parallel to planar lens 1235. In some examples, surface 1216 can reflect some optical energy of an optical signal as discussed above and allow other optical energy to pass surface 1216 and continue to propagate along an extended optical link to other processor element packages. In other words, optical link 1211 can extend beyond surface 1216 in a direction opposite arrow 1276 to another processor element package and one portion of an optical signal can be reflected at surface 1216 toward processor element package 1230 and another portion of the optical signal can be passed at surface 1216 toward the other processor element packages.

The optical signals that are incident on planar lens 1235 from surface 1216 are focused in a direction that is 180 degrees from the direction of optical signals emitted from optical coupler 1232 discussed above. Said differently, the optical signals incident on planar lens 1235 from surface 1216 are focused at an angle that is α+180 degrees with respect to normal line 1271. These optical signals are further altered (or focused) at the sub-wavelength gratings of optical coupler 1235 such that these optical signals propagate along optical coupler 1235 toward substrate 1231 in a direction opposite arrow 1275.

Figure 12F:
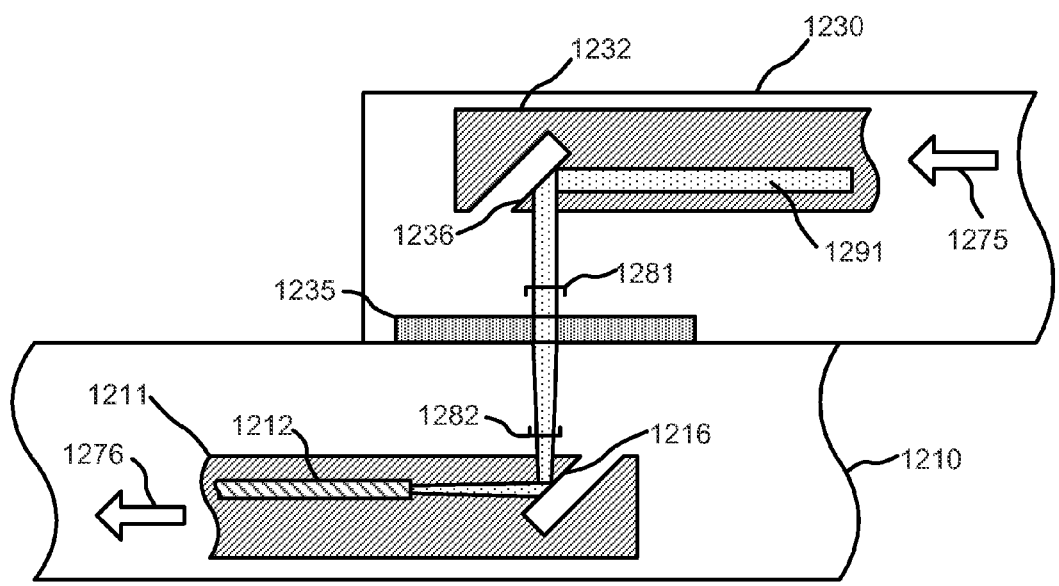

FIG. 12F is another magnified side perspective view of the composite processor that shows processor element package 1230 and optical portion 1210 of circuit board 1200. As illustrated in FIG. 12F, optical coupler 1232 includes surface 1246 that reflects optical signals—illustrated as beam 1291—propagating along optical coupler 1232 in the direction of arrow 1275 toward planar lens 1245. The optical signals have beam width 1281 before interacting with planar lens 1235. Planar lens focuses these optical signals such that beam width 1282 of these optical signals is less than beam width 1281. The optical signals are then reflected at surface 1216 into waveguide 1212 of optical link 1211 and propagate in the direction of arrow 1276. Similarly as discussed above in relation to FIG. 12E, the optical system defined by waveguide 1212, surface 1216, planar lens 1235, surface 1246, and optical coupler 1242 can operate in reverse for optical signals propagating in a direction opposite arrows 1276 and 1275.

As described above, processor element packages 1230 and 1240 can communicate one with another (i.e., exchange optical signals representing data) without intermediate conversion to electrical signals. Moreover, because planar lenses 1235 and 1245 can be used to define optical systems at processor element packages 1235 and 1245 and circuit board 1200 with planar interfaces between processor element packages 1235 and 1245 and circuit board 1200, processor element packages 1235 and 1245 can be easily coupled to circuit board 1200. For example, all optical elements (e.g., lenses, optical couplers, and/or optical waveguides) used to define an optical communications path among multiple processor element packages can be included in a circuit board and the processor element packages of a composite processor. Thus, external optical elements need not be included between a circuit board and the processor element packages of a composite processor.

Furthermore, electrical couplers 1233 and 1243 and electrical link 1221 can collectively align optical couplers 1232 and 1242 and planar lenses 1235 and 1245, respectively, with optical link 1211. For example, circuit board 1200 can include through-holes or pads via which electrical couplers 1233 and 1243 are coupled to electrical link 1221. The pads can be placed at circuit board 1220 such that optical couplers 1232 and 1242 and planar lenses 1235 and 1245, respectively, are appropriately aligned with optical link 1211 to define optical systems similar to those illustrated in FIGS. 12E and 12F.

As a specific example, a circuit board of a composite processor can include an optical link, a direct current ("DC") ground plane (an electrical link), and one or more traces (electrical links) via which an operational energy or voltage is distributed to processor element packages of the composite processor. The circuit board can also include surface-mount pads to which leads (electrical couplers) of the processor element packages can be soldered (or otherwise coupled) to connect the processor element packages to the ground plane and operational energy. Moreover, the surface-mount pads can be positioned such that the optical coupler and/or lens of each processor element package is aligned with the optical link when the leads of that processor element package are soldered to the corresponding pads of the circuit board. Said differently, pads of the circuit board can be positioned with respect to the optical link of the circuit board to align the optical coupler of a processor element package with the optical link when the leads of that processor element package are coupled to the pads.

Figure 13A:
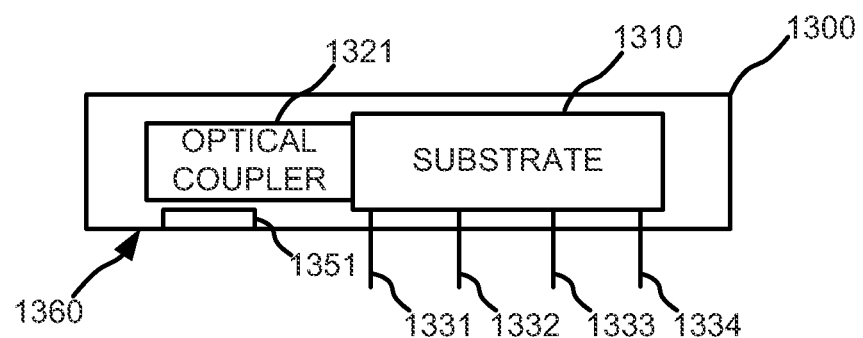
FIGS. 13A and 13B are schematic block diagrams of a processor element package, according to an example.
Figure 13B:
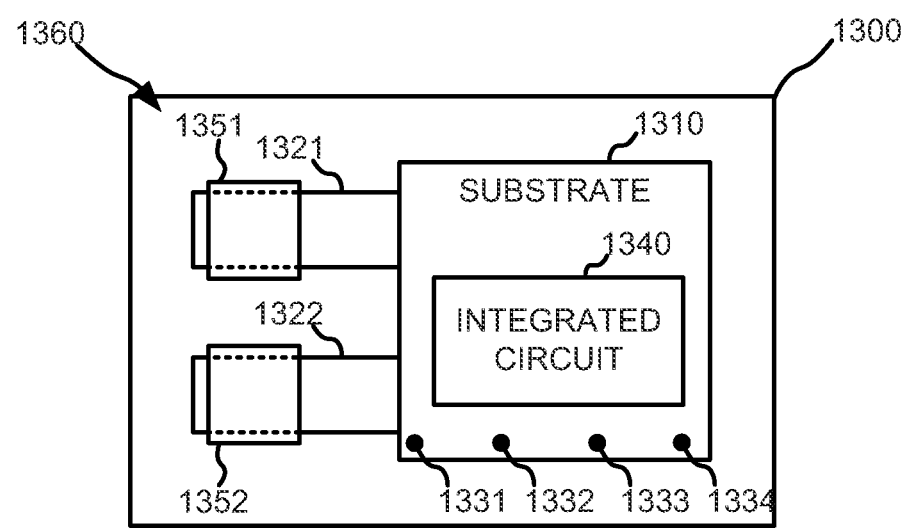

FIGS. 13A and 13B are schematic block diagrams of a processor element package, according to an example. FIGS. 13A and 13B illustrate an example of processor element package 1300 that includes multiple electrical couplers and optical couplers. Bottom face 1360 is illustrated in FIGS. 13A and 13B to orient FIGS. 13A and 13B one with another. Processor element package 1300 includes substrate 1310, integrated circuit 1340 at substrate 1310, optical couplers 1321 and 1322, electrical couplers 1331, 1332, 1333, and 1334, and planar lenses 1351 and 1352.

Processor element package 1300 includes multiple optical couplers 1321 and 1322 and planar lenses 1351 and 1352 to communicate with multiple processor element packages or to simultaneously transmit and receive optical signals. In some examples, a processor element package can include multiple optical couplers and/or planar lenses to enable multiple optical channels with other processor element packages. For example, a processor element package can include 16, 32, 64, 128, or more or fewer optical couplers and/or planar lenses to communicate with other processor element packages via multiple optical channels. In some examples, an optical coupler can have multiple optical channels. For example, one optical coupler can define (or partially define) or support multiple optical communications paths to a substrate.

Processor element package 1300 includes multiple electrical couplers 1331, 1332, 1333, and 1334 to be coupled to multiple electrical links. For example, processor element package 1300 can include multiple electrical couplers to be coupled to multiple electrical links that each provide an operational voltage such as 3.3V, 2.7V, and/or 1.8V and/or a ground reference to different portions of integrated circuit 1340 of processor element package 1300.

In some examples, some electrical couplers of a processor element package can be used for low-speed or diagnostic communication channels. For example, low pin count and/or low-speed interfaces such as a two-wire interface or a serial peripheral interconnect interface can be implemented at the integrated circuit of processor element packages and electrical couplers can be used to couple those processor element packages one to another via electrical links of a circuit board of a composite processor such that those processor element packages can communicate one with another via those interfaces.

Figure 14:
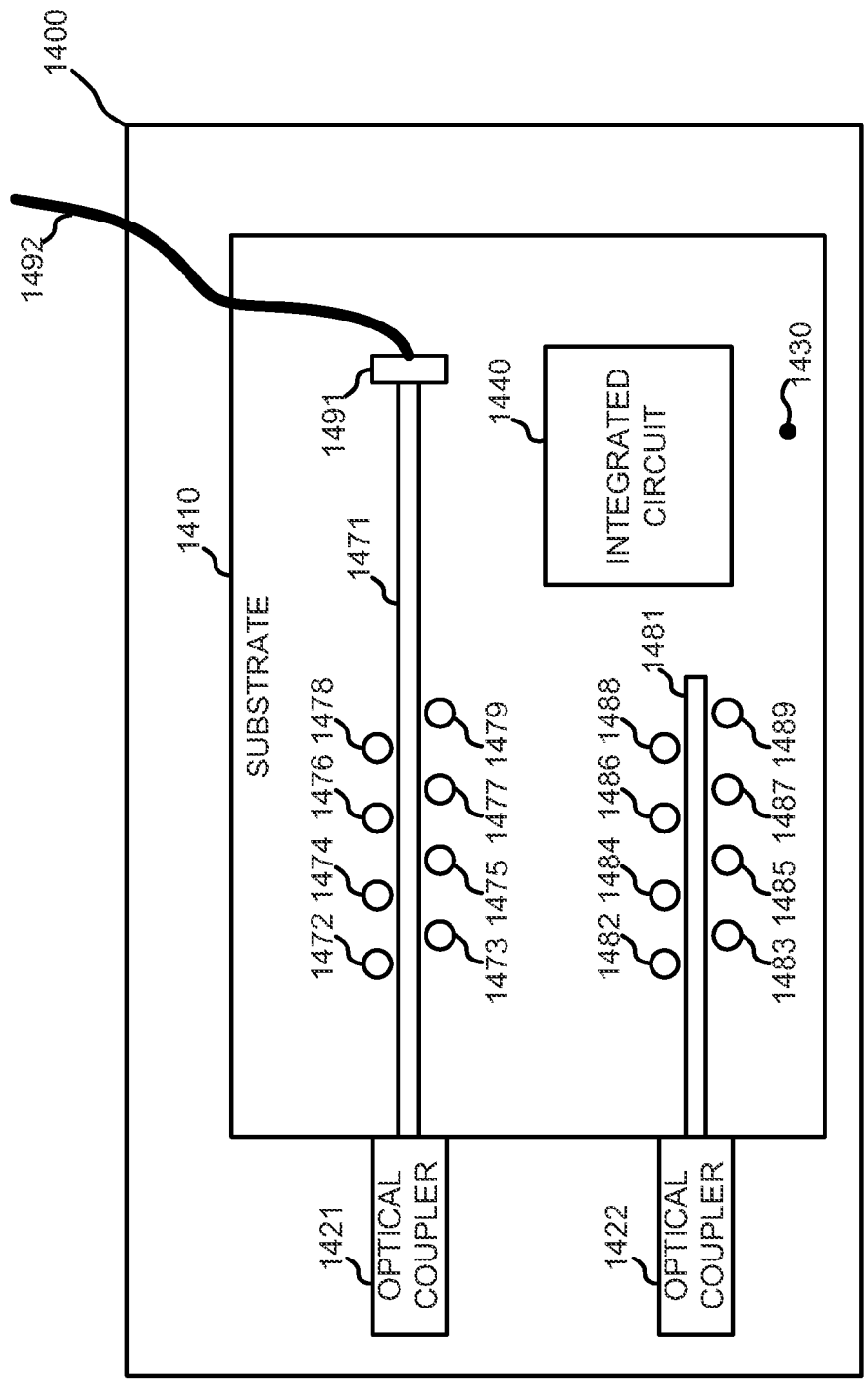
FIG. 14 is a schematic block diagram of a processor dement package including ring resonators, according to an example.

FIG. 14 is a schematic block diagram of a processor element package including ring resonators, according to an example. Processor element package 1400 includes substrate 1410, optical couplers 1421 and 1422, electrical coupler 1430, and integrated circuit 1440. Integrated circuit 1440 is coupled to ring resonator modulators 1472, 1473, 1474, 1475, 1476, 1477, 1478, and 1479 and ring resonator detectors 1482, 1483, 1484, 1485, 1486, 1487, 1488, and 1489. Ring resonator modulators 1472, 1473, 1474, 1475, 1476, 1477, 1478, and 1479 and ring resonator detectors 1482, 1483, 1484, 1485, 1486, 1487, 1488, and 1489 can be manufactured in substrates such as, for example, silicon-based substrates.

Ring resonator modulators 1472, 1473, 1474, 1475, 1476, 1477, 1478, and 1479 and ring resonator detectors 1482, 1483, 1484, 1485, 1486, 1487, 1488, and 1489 can each be associated with (e.g., tuned to) a unique wavelength of optical energy. Thus, each of ring resonator modulators 1472, 1473, 1474, 1475, 1476, 1477, 1478, and 1479 and ring resonator detectors 1482, 1483, 1484, 1485, 1486, 1487, 1488, and 1489 can be connected to a different optical channel. Said differently, processor element package 1400 can send data via eight optical channels using ring resonator modulators 1472, 1473, 1474, 1475, 1476, 1477, 1478, and 1479 and can receive data via eight optical channels at ring resonator detectors 1482, 1483, 1484, 1485, 1486, 1487, 1488, and 1489.

Ring resonator modulators 1472, 1473, 1474, 1475, 1476, 1477, 1478, and 1479 are positioned at substrate 1410 in proximity (e.g., adjacent to) optical waveguide 1471. Processor element package 1400 receives input (or source) optical energy via optical fiber 1492 which is coupled to optical waveguide 1471 via optical coupler 1491. Thus, processor element package 1400 need not generate optical energy within processor element package 1400. Rather, optical energy from which optical signals are defined for communication with other processor element packages is received from an external source via optical fiber 1492.

Multiple wavelengths of optical energy can be received at processor element package 1400 via optical fiber 1492. For example, optical fiber 1492 and waveguide 1471 can be configured to support DWDM. That is, many wavelengths of optical energy can be used to communicate with other processor element packages. These wavelengths of optical energy can be received at optical coupler 1491 and propagate along optical waveguide 1471 to optical coupler 1421 from which these wavelengths of optical energy can be focused into one or more optical links of a circuit board and distributed to other processor element packages of a composite processor including processor element package 1400.

The raw (i.e., unmodulated) wavelengths of optical energy, however, do not communicate information (or data) to the other processor element packages. Rather ring resonator modulators 1472, 1473, 1474, 1475, 1476, 1477, 1478, and 1479 are controlled by integrated circuit 1440 to modulate the wavelengths of optical energy to transmit information to other processor element packages. More specifically, integrated circuit 1440 can activate and deactivate ring resonator modulators 1472, 1473, 1474, 1475, 1476, 1477, 1478, and 1479 into on-resonance and off-resonance, respectively, states to each modulate a wavelength of optical energy from the wavelengths of optical energy received via optical fiber 1492. That is, processor element package 1400 defines optical signals that represent information by modulating the wavelengths of optical energy received via optical fiber 1492. These optical signals can be demodulated at ring resonator detectors of other processor element packages interpreted such that these processor element packages can receive the information transmitted by processor element package 1400.

Ring resonator detectors 1482, 1483, 1484, 1485, 1486, 1487, 1488, and 1489 are examples of ring resonator detectors within a processor element package. Ring resonator detectors 1482, 1483, 1484, 1485, 1486, 1487, 1488, and 1489 are located at substrate 1410 within proximity to optical waveguide 1481. Optical signals (i.e., modulated wavelengths of optical energy) are received at processor element package 1400 via optical coupler 1422. These optical signals propagate along optical waveguide 1482 past ring resonator detectors 1482, 1483, 1484, 1485, 1486, 1487, 1488, and 1489. Ring resonator detectors 1482, 1483, 1484, 1485, 1486, 1487, 1488, and 1489 detect (e.g., demodulate) the optical signals and the demodulated information (e.g., data modulated onto the wavelengths of optical energy) is interpreted by integrated circuit 1440. For example, each ring resonator detector from ring resonator detectors 1482, 1483, 1484, 1485, 1486, 1487, 1488, and 1489 can detect the optical signals modulated onto a particular wavelength of optical energy. Thus, processor element package 1400 can optically transmit and receive information within a composite processor without intermediate opto-electronic elements.

In some examples, other arrangements of ring resonators (e.g., modulators and/or detectors) can be implanted at the processor element packages of a composite processor. For example, source wavelengths of optical energy can be received at each processor element package of the composite processor and output via an optical coupler and/or planar lens to the other processor element packages of the composite processor via one or more optical links at the circuit board of the composite processor. Each processor element package of the composite processor can receive the wavelengths of optical energy, modulate one or more of the wavelengths of optical energy to send data to the processor element package at which the wavelengths of optical energy were originally received, and pass the wavelengths of optical energy (some or all of which may now be modified) to the one or more optical links to the other processor element packages of the composite processor.

This propagation can continue in a ring fashion among the processor element packages (or a subset thereof) of the composite processor until the wavelengths of optical energy are received (after passing through other processor element packages of the composite processor) at the processor element package at which the wavelengths of optical energy were originally received. The wavelengths of optical energy are received at that processor element package at an optical coupler optically coupled to an optical waveguide in proximity to which ring resonator detectors are located to demodulate any information modulated onto the wavelengths of optical energy. The demodulated information is interpreted at the integrated circuit of that processor element package and, thus, that processor element package receives information transmitted to it by one or more other processor element packages of the composite processor.

Moreover, various arbitration schemes, contention resolution schemes, and/or other methodologies can be used to prevent corruption of information transmitted among the processor element packages of a composite processor. For example, a token passing arbitration scheme can be implemented to prevent multiple processor element packages from modulating information onto an already modulated wavelength of optical energy. Moreover, time-division multiplexing and/or wavelength division multiplexing such as DWDM can be used to mitigate and/or eliminate corruption or collision of information transmitted optically within a composite processor.

Additionally, processor element package 1400 can be coupled to one or more other optical fibers in addition to optical fiber 1492. For example, processor element package 1400 can be optically coupled to an optical fiber that can be coupled to a remote device. For example, processor element package 1400 can be optically coupled to a remote (i.e., not a component of a common composite processor with processor element package 1400) memory module or other device via an optical fiber. Similarly as discussed above with reference to waveguides 1471 and 1481 and optical couplers 1421 and 1422, respectively, processor element package 1400 can include ring resonator modulators and detectors to communicate with such a remote device using multiple wavelengths of optical energy (i.e., using DWDM) via an optical fiber that supports multiple wavelengths of optical energy.

While certain examples have been shown and described above, various changes in form and details may be made. For example, although some one-dimensional and two-dimensional grating patterns are described as being composed of sub-patterns, in practice, the period, duty cycle, and thickness of the lines, posts, and holes of the one and two-dimensional gratings can be continuously varying. Moreover, some features of examples that have been described in relation to one example and/or process can be useful to other examples. In other words, features and/or properties of various examples described in relation to one example can be related to other examples. Furthermore, it should be understood that the systems and apparatus described herein can include various combinations and/or sub-combinations of the components and/or features of the different examples described. Thus, features described with reference to one or more examples can be combined with other examples described herein.

What is claimed is:

1. A composite processor, comprising:
    a circuit board having an optical link and an electrical link;
    a first processor element package including a substrate having an integrated circuit, a sub-wavelength grating optical coupler, and an electrical coupler, the electrical coupler of the first processor element package coupled to the electrical link of the circuit board; and
    a second processor element package including a substrate having an integrated circuit, a sub-wavelength grating optical coupler, and an electrical coupler, the electrical coupler of the second processor element package coupled to the electrical link of the circuit board,
    the sub-wavelength grating optical coupler of the first processor element package, the optical link of the circuit board, and the sub-wavelength grating optical coupler of the second processor element package collectively defining an optical communications path between the substrate of the first processor element package and the substrate of the second processor element package.

2. The composite processor of claim 1, wherein:
the sub-wavelength grating optical coupler of the first processor element package is in optical communication with the substrate of the first processor element package; and
the sub-wavelength grating optical coupler of the second processor element package is in optical communication with the substrate of the second processor element package.

3. The composite processor of claim 1, wherein the second processor element package is a first coprocessor package and the optical communications path is a dense wavelength division multiplexing optical communications path, the composite processor further comprising:
a second coprocessor package different from the first coprocessor package including a substrate having an integrated circuit, an sub-wavelength grating optical coupler, and an electrical coupler, the electrical coupler of the second coprocessor package coupled to the electrical link of the circuit board,
the sub-wavelength grating optical coupler of the first processor element package, the optical link of the circuit board, the sub-wavelength grating optical coupler of the first coprocessor package, and the sub-wavelength grating optical coupler of the second coprocessor package collectively defining the dense wavelength division multiplexing optical communications path among the substrate of the first processor element package, the substrate of the first coprocessor package, and the substrate of the second coprocessor package.

4. The composite processor of claim 1, wherein:
the optical link of the circuit board is a dense wavelength division multiplexing optical link;
the first processor element package includes a plurality of ring resonator detectors to demodulate optical signals received at the sub-wavelength grating optical coupler of the first processor element package; and
the second processor element package includes a plurality of ring resonator modulators to modulate optical energy received the second processor element package.

5. The composite processor of claim 1, wherein:
the sub-wavelength grating optical coupler of the first processor element package is operatively coupled to the optical link of the circuit board via a planar lens having a non-periodic, sub-wavelength grating; and
the sub-wavelength grating optical coupler of the second processor element package is operatively coupled to the optical link of the circuit board via a planar lens having a non-periodic, sub-wavelength grating.

6. The composite processor of claim 1, wherein:
the first processor element package includes a planar lens having a non-periodic, sub-wavelength grating;
the second processor element package includes a planar lens having a non-periodic, sub-wavelength grating;
sub-wavelength grating optical coupler of the first processor element package is operatively coupled to the optical link of the circuit board via the planar lens of the first processor element package; and
the sub-wavelength grating optical coupler of the second processor element package is operatively coupled to the optical link of the circuit board via the planar lens of the second processor element package.

7. A processor system, comprising:
a circuit board having a optical link and an electrical link;
a central processor unit package including a substrate having an integrated circuit, an optical coupler, and an electrical coupler, the electrical coupler of the central processor unit package coupled to the electrical link of the circuit board;
a coprocessor package including a substrate having an integrated circuit, an optical coupler, and an electrical coupler, the electrical coupler of the coprocessor package coupled to the electrical link of the circuit board; and
the optical coupler of the central processor unit package, the optical coupler of the coprocessor package, and the optical link of the circuit board collectively defining a dense wavelength division multiplexing optical communications path among the substrate of the central processor unit package and the substrate of the coprocessor package.

8. The processor system of claim 7, wherein the optical link of the circuit board is a first optical link and the coprocessor package is a first coprocessor package, the processor system further comprising:
a second coprocessor package including a substrate having an integrated circuit, an optical coupler, and an electrical coupler, the electrical coupler of the second coprocessor package coupled to the electrical link of the circuit board, the second coprocessor package different from the first coprocessor package,
the optical coupler of the central processor unit package, the optical coupler of the second coprocessor package, and a second optical link of the circuit board collectively defining a dense wavelength division multiplexing optical communications path between the substrate of the central processor unit package and the substrate of the second coprocessor package.

9. The processor system of claim 7, wherein the optical link is a plurality of dense wavelength division multiplexing optical waveguides, at least one dense wavelength division multiplexing optical waveguide from the plurality of dense wavelength division multiplexing optical waveguides uniquely associated with each of the central processor unit package and the coprocessor package.

10. The processor system of claim 7, wherein:
the optical coupler of the central processor unit package is optically coupled to the optical link of the circuit board via a first planar lens having a non-periodic, sub-wavelength grating; and
the optical coupler of the coprocessor package is optically coupled to the optical link of the circuit board via a second planar lens having a non-periodic, sub-wavelength grating.

11. The processor system of claim 7, wherein:
the central processor unit package includes a planar lens having a non-periodic, sub-wavelength grating at a bottom face of the central processor unit package; and
the coprocessor package includes a planar lens having a non-periodic, sub-wavelength grating at a bottom face of the coprocessor package.

12. The processor system of claim 7, wherein data signals are distributed among the substrate of the central processor unit package and the substrate of the coprocessor package exclusively via the dense wavelength division multiplexing optical communications path.

13. A processor unit package, comprising:
a substrate having an integrated circuit defining logic to implement a processor unit;
an optical coupler optically coupled to the substrate;

a planar lens having a non-periodic, sub-wavelength grating to define an optical path between the optical coupler and an optical link of a circuit board; and an electrical coupler operatively coupled to the substrate.

14. The processor unit package of claim 13, further comprising:

a dense wavelength division multiplexing waveguide optically coupled to the substrate to receive source optical energy at the substrate.

15. The processor unit package of claim 13, further comprising:

a plurality of ring resonator modulators to demodulate optical signals received at the optical coupler.

* * * * *